United States Patent
Arai et al.

(10) Patent No.: US 9,494,793 B2
(45) Date of Patent: Nov. 15, 2016

(54) LIGHT BEAM SCANNING DEVICE AND IMAGE FORMING APPARATUS

(71) Applicants: Nobuyuki Arai, Kanagawa (JP);
Makoto Hirakawa, Kanagawa (JP);
Yoshinobu Sakaue, Kanagawa (JP);
Noboru Kusunose, Kanagawa (JP);
Tomoya Fujii, Kanagawa (JP)

(72) Inventors: Nobuyuki Arai, Kanagawa (JP);
Makoto Hirakawa, Kanagawa (JP);
Yoshinobu Sakaue, Kanagawa (JP);
Noboru Kusunose, Kanagawa (JP);
Tomoya Fujii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 417 days.

(21) Appl. No.: 13/716,782

(22) Filed: Dec. 17, 2012

(65) Prior Publication Data
US 2013/0188004 A1 Jul. 25, 2013

(30) Foreign Application Priority Data
Jan. 24, 2012 (JP) .................................. 2012-011638

(51) Int. Cl.
G02B 26/12 (2006.01)
G02B 7/02 (2006.01)
B41J 2/44 (2006.01)

(52) U.S. Cl.
CPC ................ *G02B 26/124* (2013.01); *B41J 2/44* (2013.01); *B41J 2/442* (2013.01); *G02B 7/02* (2013.01); *G02B 7/021* (2013.01); *G02B 26/123* (2013.01)

(58) Field of Classification Search
CPC ......... B41J 2/473; G02B 26/124; G02B 7/21
See application file for complete search history.

(56) References Cited

U.S. PATENT DOCUMENTS

| | | | |
|---|---|---|---|
| 2002/0001118 A1* | 1/2002 | Nakajima et al. | 359/204 |
| 2003/0137710 A1* | 7/2003 | Nishikiuchi et al. | 359/204 |
| 2005/0174418 A1 | 8/2005 | Sakaue et al. | |
| 2005/0206717 A1* | 9/2005 | Boyatt et al. | 347/242 |
| 2006/0055769 A1 | 3/2006 | Yamazaki et al. | |
| 2007/0002417 A1 | 1/2007 | Hirakawa et al. | |
| 2007/0030538 A1 | 2/2007 | Hirakawa et al. | |
| 2007/0053040 A1 | 3/2007 | Sakaue et al. | |

(Continued)

FOREIGN PATENT DOCUMENTS

| | | |
|---|---|---|
| CN | 1474211 A | 2/2004 |
| CN | 1542491 A | 11/2004 |

(Continued)

OTHER PUBLICATIONS

Combined Chinese Office Action and Search Report issued on Dec. 2, 2014 in Patent Application No. 201310027668.0 with English translation of category of cited documents.

(Continued)

*Primary Examiner* — Kristal Feggins
*Assistant Examiner* — Kendrick Liu
(74) *Attorney, Agent, or Firm* — Oblon, McClelland, Maier & Neustadt, L.L.P.

(57) ABSTRACT

In a light beam scanning device, a plurality of light sources, which irradiates a plurality of light beams in a first direction and is retained by a holder, are disposed at distance from one another in a second direction orthogonal to the first direction. The plurality of light beams are incident, via a coupling optical system, to deflecting and reflecting surfaces of a deflector from a direction that is tilted with respect to a plane orthogonal to the rotational shaft of the deflector. The holder is supported by a housing of the light beam scanning device at a plurality of different positions in a third direction extending from the light source to the coupling optical system.

18 Claims, 22 Drawing Sheets

(56) References Cited

U.S. PATENT DOCUMENTS

| | | | |
|---|---|---|---|
| 2007/0064087 A1 | 3/2007 | Matsumae et al. | |
| 2007/0091407 A1* | 4/2007 | Oyama et al. | 359/210 |
| 2007/0188589 A1 | 8/2007 | Kusunose et al. | |
| 2007/0215800 A1 | 9/2007 | Miyatake et al. | |
| 2007/0216754 A1 | 9/2007 | Miyatake | |
| 2007/0242333 A1* | 10/2007 | Kato | 359/204 |
| 2008/0024851 A1 | 1/2008 | Sakaue et al. | |
| 2008/0180772 A1 | 7/2008 | Miyatake et al. | |
| 2008/0204842 A1 | 8/2008 | Arai et al. | |
| 2008/0219601 A1 | 9/2008 | Arai et al. | |
| 2008/0225304 A1 | 9/2008 | Sakaue et al. | |
| 2008/0266633 A1 | 10/2008 | Hirakawa et al. | |
| 2008/0267662 A1 | 10/2008 | Arai et al. | |
| 2008/0267663 A1 | 10/2008 | Ichii et al. | |
| 2008/0285104 A1 | 11/2008 | Arai et al. | |
| 2009/0022520 A1 | 1/2009 | Sakaue et al. | |
| 2009/0058981 A1 | 3/2009 | Higaki et al. | |
| 2009/0060582 A1 | 3/2009 | Ichii et al. | |
| 2009/0066780 A1 | 3/2009 | Bannai et al. | |
| 2009/0141316 A1 | 6/2009 | Arai et al. | |
| 2009/0195636 A1 | 8/2009 | Arai et al. | |
| 2009/0195849 A1 | 8/2009 | Ichii et al. | |
| 2009/0214261 A1 | 8/2009 | Hirakawa et al. | |
| 2009/0251753 A1 | 10/2009 | Hirakawa et al. | |
| 2009/0314927 A1 | 12/2009 | Tatsuno et al. | |
| 2010/0097679 A1 | 4/2010 | Hirakawa | |
| 2011/0012982 A1 | 1/2011 | Arai | |
| 2011/0052263 A1 | 3/2011 | Tatsuno et al. | |
| 2011/0122217 A1 | 5/2011 | Arai et al. | |
| 2011/0221857 A1 | 9/2011 | Tatsuno et al. | |
| 2011/0316957 A1 | 12/2011 | Sakaue et al. | |
| 2012/0062685 A1 | 3/2012 | Serizawa et al. | |
| 2012/0177409 A1 | 7/2012 | Arai et al. | |

FOREIGN PATENT DOCUMENTS

| | | |
|---|---|---|
| CN | 101000404 A | 7/2007 |
| JP | 11-014932 | 1/1999 |
| JP | 11-038348 | 2/1999 |
| JP | 2001-296493 | 10/2001 |
| JP | 2003-005114 | 1/2003 |
| JP | 2006-032584 | 2/2006 |
| JP | 2007-240817 | 9/2007 |
| JP | 2007-248686 | 9/2007 |
| JP | 2007-304166 | 11/2007 |
| JP | 2009-14953 A | 1/2009 |

OTHER PUBLICATIONS

Office Action issued Aug. 5, 2015, in Japanese Patent Application No. 2012-011638.

* cited by examiner

FIG. 10

|  | INCIDENT | REFLECTED |
|---|---|---|
| $R_m$ | −41.814 (mm) | −29.533 (mm) |
| $K$ | 0 | 0 |
| $A_4$ | $2.730 \times 10^{-6}$ | $2.927 \times 10^{-6}$ |
| $A_6$ | $-6.900 \times 10^{-9}$ | $-7.360 \times 10^{-10}$ |
| $A_8$ | $-1.516 \times 10^{-11}$ | $-1.312 \times 10^{-11}$ |
| $A_{10}$ | $4.176 \times 10^{-14}$ | $2.448 \times 10^{-14}$ |
| $A_{12}$ | $-1.211 \times 10^{-18}$ | $-4.655 \times 10^{-17}$ |
| $A_{14}$ | $-4.712 \times 10^{-20}$ | $3.651 \times 10^{-20}$ |
| $R_z$ | ∞ | ∞ |
| $B_1$ | 0 | 0 |
| $B_2$ | 0 | 0 |
| $B_3$ | 0 | 0 |
| $B_4$ | 0 | 0 |
| $B_5$ | 0 | 0 |
| $B_6$ | 0 | 0 |
| $B_7$ | 0 | 0 |
| $B_8$ | 0 | 0 |
| $B_9$ | 0 | 0 |
| $B_{10}$ | 0 | 0 |
| $B_{11}$ | 0 | 0 |
| $B_{12}$ | 0 | 0 |

FIG. 11

|  | INCIDENT | REFLECTED |
|---|---|---|
| $R_m$ | $-1250.000$ (mm) | $725.972$ (mm) |
| $K$ | 0 | 0 |
| $A_4$ | $-9.923 \times 10^{-6}$ | $-4.003 \times 10^{-7}$ |
| $A_6$ | $2.110 \times 10^{-11}$ | $4.208 \times 10^{-11}$ |
| $A_8$ | 0 | $3.088 \times 10^{-15}$ |
| $A_{10}$ | 0 | $-1.755 \times 10^{-18}$ |
| $A_{12}$ | 0 | $2.812 \times 10^{-22}$ |
| $A_{14}$ | 0 | $-1.530 \times 10^{-26}$ |
| $R_z$ | $\infty$ | $-26.956$ (mm) |
| $B_1$ | 0 | 0 |
| $B_2$ | 0 | $2.755 \times 10^{-6}$ |
| $B_3$ | 0 | 0 |
| $B_4$ | 0 | $-6.461 \times 10^{-10}$ |
| $B_5$ | 0 | 0 |
| $B_6$ | 0 | $9.604 \times 10^{-14}$ |
| $B_7$ | 0 | 0 |
| $B_8$ | 0 | $-4.667 \times 10^{-18}$ |
| $B_9$ | 0 | 0 |
| $B_{10}$ | 0 | 0 |
| $B_{11}$ | 0 | 0 |
| $B_{12}$ | 0 | 0 |

FIG. 14
| $\theta_1$ | $\theta_2$ | d1 | d2 | d3 | d4 |
|---|---|---|---|---|---|
| 70.0° | 34.2° | 12.54mm | 2.98mm | 12.02mm | 8.10mm |
| d5 | d6 | d7 | d8 | d9 |
|---|---|---|---|---|
| 3.00mm | 81.00mm | 25.00mm | 90.85mm | 93.15mm |
FIG. 15A
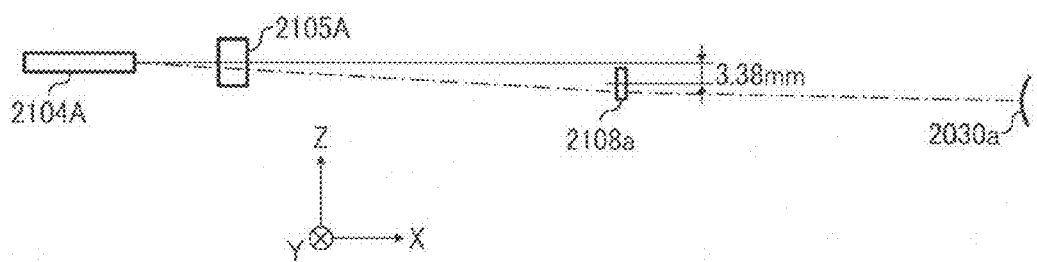
FIG. 15B
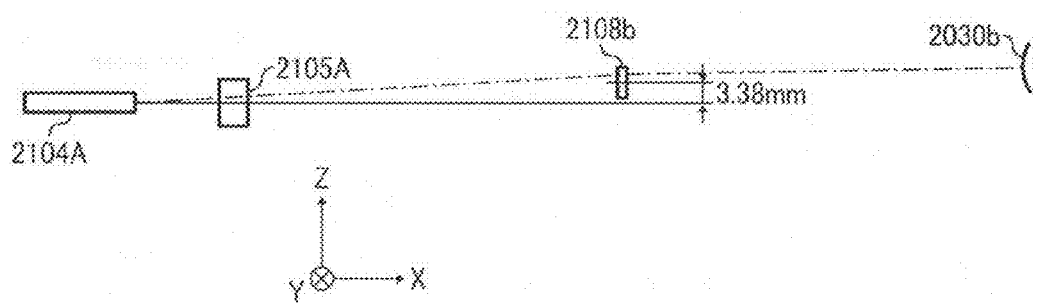

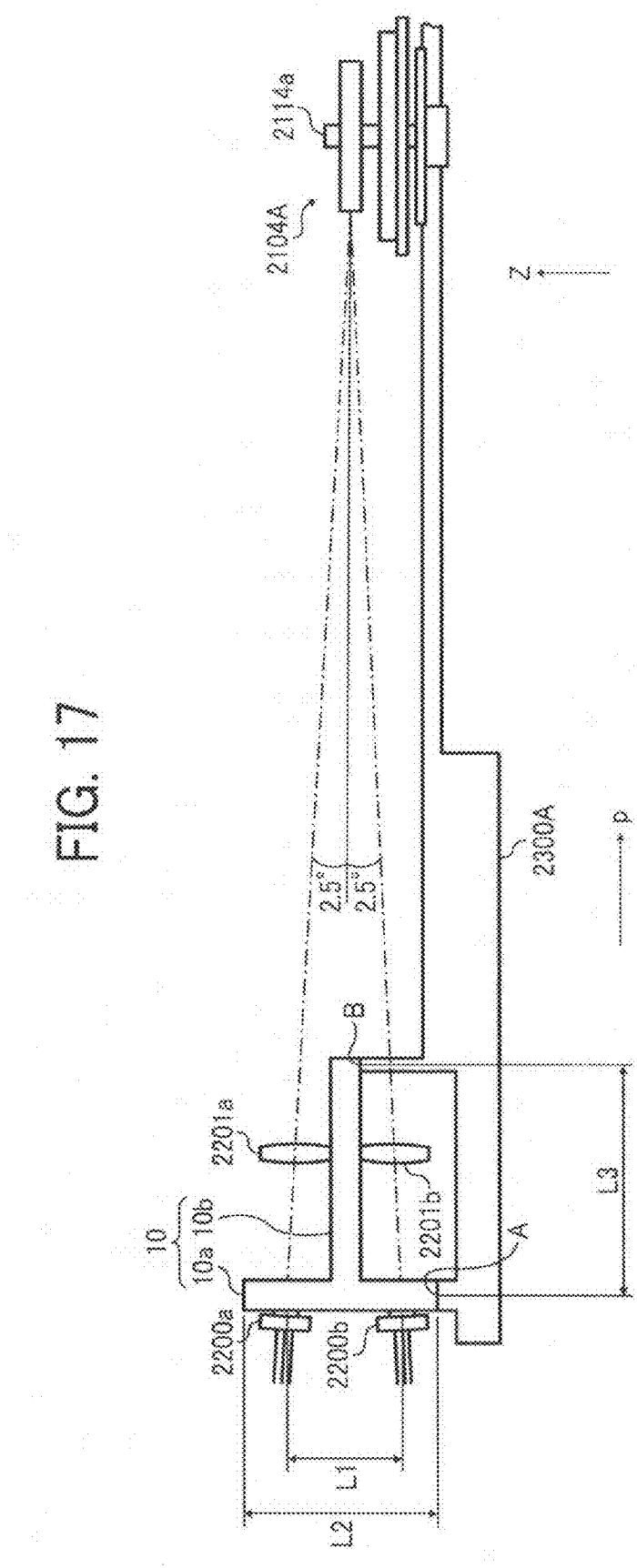

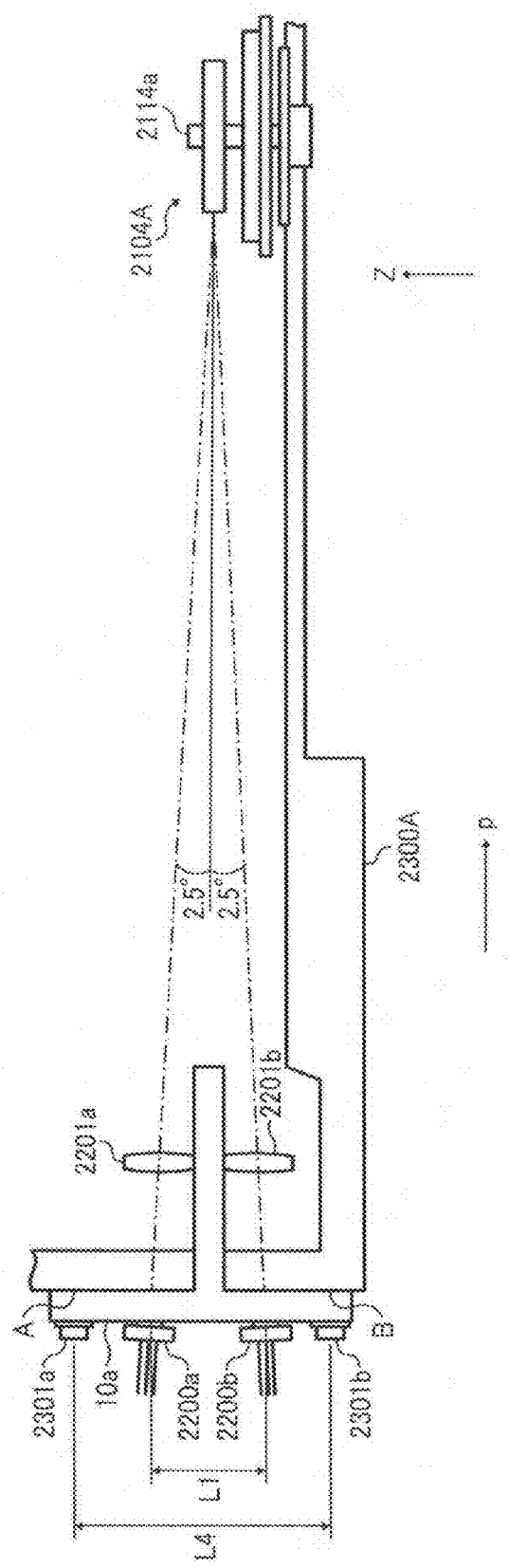

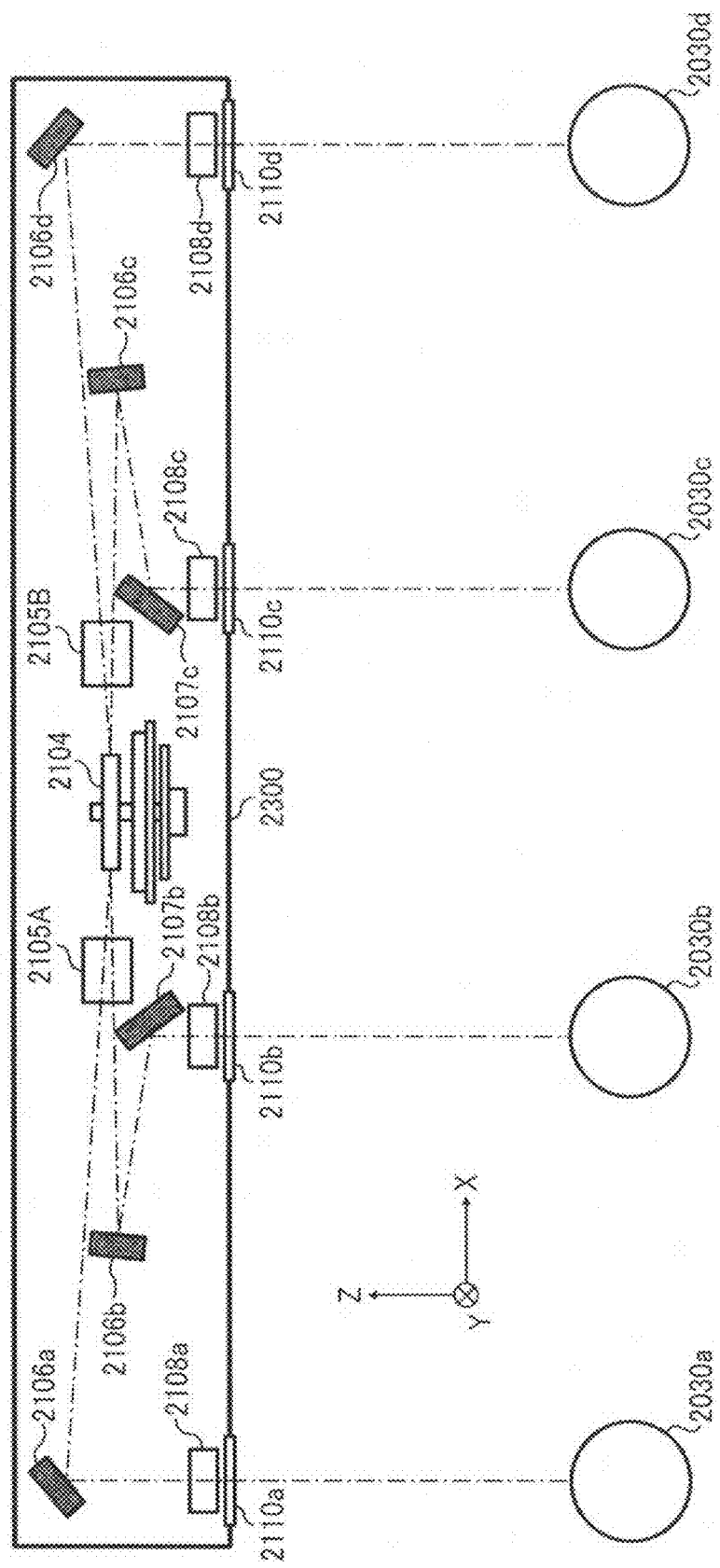

LIGHT BEAM SCANNING DEVICE AND IMAGE FORMING APPARATUS

CROSS-REFERENCE TO RELATED APPLICATIONS

This patent application is based on and claims priority pursuant to 35 U.S.C. §119 to Japanese Patent Application No. 2012-011638, filed on Jan. 24, 2012, in the Japan Patent Office, the entire disclosure of which is hereby incorporated by reference herein.

BACKGROUND OF THE INVENTION

1. Field of the Invention

The present invention relates to a light beam scanning device and an image forming apparatus, and more particularly to a light beam scanning device that scans a scanned surface with a light beam and an image forming apparatus provided with the light beam scanning device.

2. Description of the Related Art

Japanese Patent Application Publication No. JP-2003-005114A (4454186-B1) discloses an image forming apparatus, in which the light beam is obliquely incident to a deflecting and reflecting surface of an optical deflector to achieve size reduction and cost reduction of the image forming apparatus. Compared with the case that the light beam is horizontally incident to the deflecting and reflecting surface of the optical deflector, the image forming apparatus with the obliquely incident light beam may suffer from drawbacks that (a) a scanning line curve tends to increase and (b) a diameter of a beam spot tends to increase.

In view of the above, there are various techniques to correct the scanning line curve. For example, Japanese Patent Application Publication No. JP-H11-014932-A (4057099-B1) discloses a method of producing a lens having a correction refractive surface that corrects the scanning line curve. Japanese Patent Application Publication No. JP-H11-038348-A (4098851-B1) discloses a scanning image forming optical system having a correction reflecting surface that corrects the scanning line curve.

Japanese Patent Application Publication No. JP-2007-248686-A discloses a light source device capable of reducing the scanning line curve and degradation in wavefront aberration. The light source device includes a light source retaining member. In the light source retaining member, plural light sources and plural lenses each of which is provided for each one of the light sources are arranged distant from one another in at least a sub-scanning direction such that they are integrally retained. Each light source is disposed such that the light beam emitted from the light source has an angle with respect to the sub-scanning direction, and the light source retaining member is tilted with respect to the sub-scanning direction.

SUMMARY OF THE INVENTION

In the background light beam scanning device in which the oblique incident system is used, it has been difficult to suppress the curve in scanning line and the degradation in wavefront aberration while archiving the requirements for downsizing at the same time.

In view of the above, one aspect of the present invention is to provide a light beam scanning device, in which a plurality of light sources that irradiates a plurality of light beams in a first direction is retained by a holder and disposed at distance from one another in a second direction orthogonal to the first direction. The plurality of light beams are incident, via a coupling optical system, to deflecting and reflecting surfaces of a deflector from a direction that is tilted with respect to a plane orthogonal to the rotational shaft of the deflector. The holder is supported by a housing of the light beam scanning device at a plurality of different positions in a third direction extending from the light source to the coupling optical system.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 10 is a table for illustrating a set of coefficients that defines a shape of each optical surface of a first scanning lens of the light beam scanning device in FIG. 1;

FIG. 11 is a table for illustrating a set of coefficients that defines a shape of each optical surface of a second scanning lens of the light beam scanning device in FIG. 1;

FIG. 14 is a table for illustrating the numerical example of optical path lengths of the optical members illustrated in FIGS. 12 and 13;

FIGS. 15A and 15B are views illustrating a relationship between the first scanning lens and the second scanning lens in the first light beam scanning device of FIG. 1;

FIG. 17 is a view illustrating a holder and a bracket in the first light beam scanning device of FIG. 1, according to an example embodiment of the present invention;

FIG. 18 is a view illustrating a holder and a bracket in the background light beam scanning device of FIG. 1;

FIG. 28 is a view illustrating a configuration of the light beam scanning device of FIG. 27.

Figure 1:
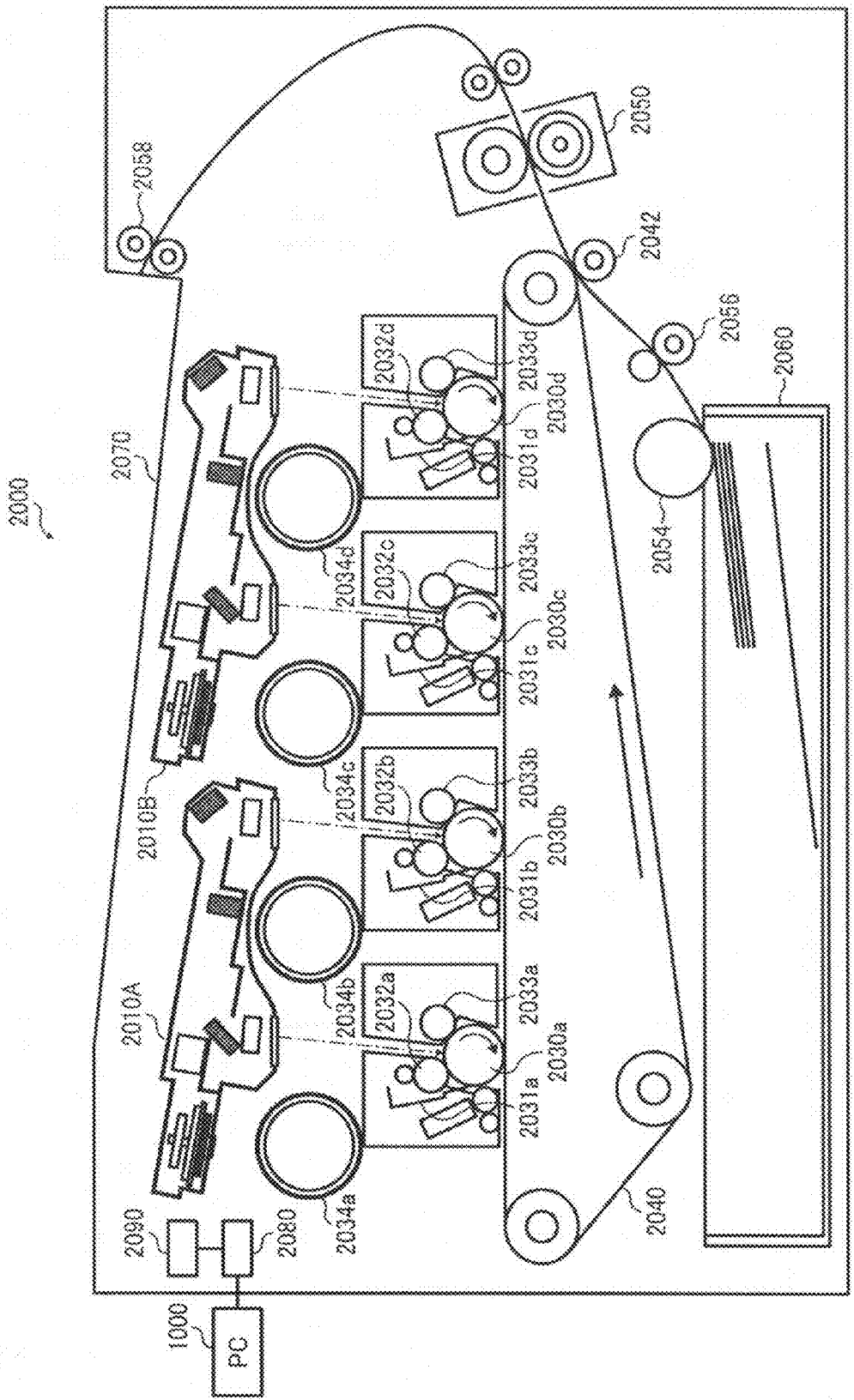
FIG. 1 is a view illustrating a schematic configuration of a color printer including a first light beam scanning device and a second light beam scanning device, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Hereinafter, an embodiment of the invention will be described with reference to FIGS. 1 to 23. FIG. 1 illustrates a schematic configuration of a color printer 2000 as an example of the image forming apparatus.

The color printer 2000 in FIG. 1 is a tandem type multi-color printer in which a full-color image is formed by superimposing images of four colors (black, yellow, magenta, and cyan). The color printer 2000 includes two light beam scanning devices 2010A and 2010B (collectively referred to as the light beam scanning device 2010"), four photosensitive drums 2030a, 2030b, 2030c, and 2030d (collectively referred to as the photosensitive drum 2030), four cleaning units 2031a, 2031b, 2031c, and 2031d (collectively referred to as the cleaning unit 2031), four charging devices 2032a, 2032b, 2032c, and 2032d (collectively referred to as the charging device 2032), four development rollers 2033a, 2033b, 2033c, and 2033d (collectively referred to as the development roller 2033), four toner cartridges 2034a, 2034b, 2034c, and 2034d (collectively referred to as the toner cartridge 2034), a transfer belt 2040, a transfer roller 2042, a fixing device 2050, a sheet feed skid (roller) 2054, a registration roller pair 2056, a sheet discharge roller pair 2058, a sheet feed tray 2060, a sheet discharge tray 2070, a communication control device 2080, and a printer control device 2090 that controls entire operation of the color printer 2000.

The communication control device 2080 controls bi-directional communication with an upper-node apparatus 1000 (for example, a personal computer) through a network.

The printer control device 2090 includes a CPU, a ROM in which a program described in a CPU-readable code and various kinds of data used in executing the program are stored, a RAM functioning as a work memory, and an A/D conversion circuit that converts analog data into digital data. The printer control device 2090 controls each device in the color printer 2000 according to a request received from the upper-node apparatus. The printer control device 2090 transmits image information from the upper-node apparatus to the light beam scanning device 2010.

The photosensitive drum 2030a, the charging device 2032a, the development roller 2033a, the toner cartridge 2034a, and the cleaning unit 2031a constitute an image forming station (hereinafter also referred to as a "K station") that forms a black image.

The photosensitive drum 2030b, the charging device 2032b, the development roller 2033b, the toner cartridge 2034b, and the cleaning unit 2031b constitute an image forming station (hereinafter also referred to as a "Y station") that forms a yellow image.

The photosensitive drum 2030c, the charging device 2032c, the development roller 2033c, the toner cartridge 2034c, and the cleaning unit 2031c constitute an image forming station (hereinafter also referred to as an "M station") that forms a magenta image.

The photosensitive drum 2030d, the charging device 2032d, the development roller 2033d, the toner cartridge 2034d, and the cleaning unit 2031d constitute an image forming station (hereinafter also referred to as a "C station") that forms a cyan image.

The surface of each photosensitive drum 2030, which is formed with a photosensitive layer, functions as a surface to be scanned, i.e., the scanned surface. It is assumed that each photosensitive drum 2030 is rotated in a direction of arrow in FIG. 1 by a rotating mechanism including a driving device.

Each charging device 2032 evenly changes the surface of the corresponding photosensitive drum 2030.

The light beam scanning device 2010A generates a modulated light beam in black color based on black image information under control of the printer control device 2090, and irradiates the charged surface of the photosensitive drum 2030a with the modulated light beam in black color. Similarly, the light beam scanning device 2010A irradiates the charged surface of the photosensitive drum 2030b with the modulated light beam in cyan color, which is generated based on cyan image information under control of the printer control device 2090.

The light beam scanning device 2010B generates a modulated light beam in magenta color based on magenta image information under control of the printer control device 2090, and irradiates the charged surface of the photosensitive drum 2030c with the modulated light beam in black color. Similarly, the light beam scanning device 2010B irradiates the charged surface of the photosensitive drum 2030d with the modulated light beam in yellow color, which is generated based on yellow image information under control of the printer control device 2090.

Therefore, a latent image corresponding to the image information on each color is formed on the surface of each photosensitive drum 2030. The latent image is transferred in a direction of the corresponding development roller 2033 according to the rotation of the photosensitive drum 2030. The light beam scanning device 2010 is described in detail below.

According to the rotation of the development roller 2033, toner from the corresponding toner cartridge 2034 is evenly applied to the surface of each development roller 2033. As toner comes into contact with the surface of the corresponding photosensitive drum 2030, toner on the surface of each development roller 2033 is transferred and adheres to a surface portion, which is irradiated with the light. That is, each development roller 2033 causes the toner to adhere to and visualize the latent image formed on the surface of the corresponding photosensitive drum 2030. The image (toner image) to which the toner adheres moves in the direction of the transfer belt 2040 according to the rotation of the photosensitive drum 2030.

The black, yellow, magenta, and cyan toner images are sequentially transferred to the transfer belt 2040 at a predetermined timing, and superimposed on one another, thereby forming a multicolor image.

Recording sheets are stored in the sheet feed tray 2060. The sheet feed skid 2054 is disposed near the sheet feed tray 2060. The sheet feed skid 2054 takes out the recording sheet from the sheet feed tray 2060 one by one, and conveys the recording sheet to the registration roller pair 2056. The registration roller pair 2056 delivers the recording sheet to a nip formed between the transfer belt 2040 and the transfer roller 2042 at a predetermined timing. Therefore, the color image on the transfer belt 2040 is transferred to the recording sheet. The recording sheet to which the color image is transferred is delivered to the fixing device 2050.

The fixing device 2050 applies heat and pressure to the recording sheet to fix the toner image onto the recording sheet. The recording sheet to which the toner is fixed is delivered to the sheet discharge tray 2070 through the sheet discharge roller 2058, and sequentially stacked on the sheet discharge tray 2070.

Each cleaning unit 2031 removes the toner (residual toner) remaining on the surface of the corresponding photosensitive drum 2030. The surface of the photosensitive drum 2030 from which the residual toner is removed returns to a position facing the corresponding charging device 2032.

Now, a configuration of the light beam scanning device 2010A will be described.

Figure 2:
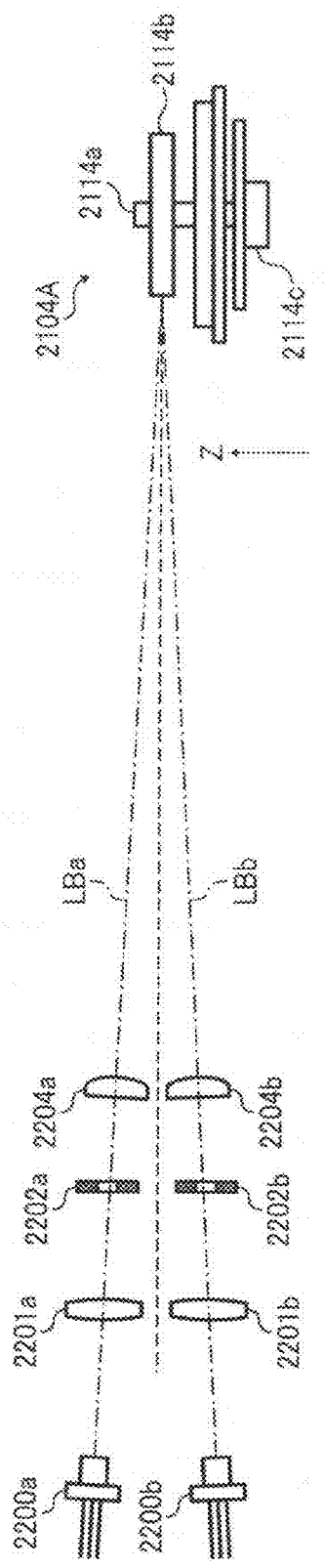
FIG. 2 is a view illustrating a light source and a pre-deflector optical system in the first light beam scanning device of FIG. 1.
Figure 3:
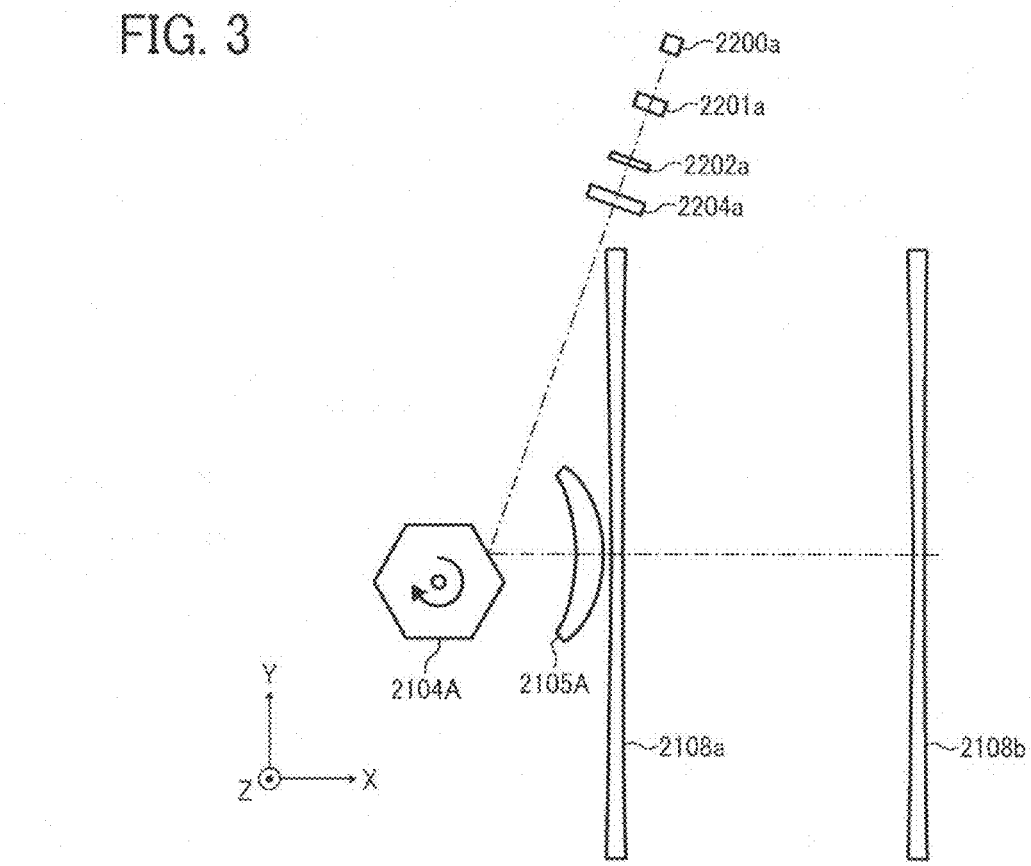
FIG. 3 is another view illustrating the light source and the pre-deflector optical system in the first light beam scanning device of FIG. 1.
Figure 4:
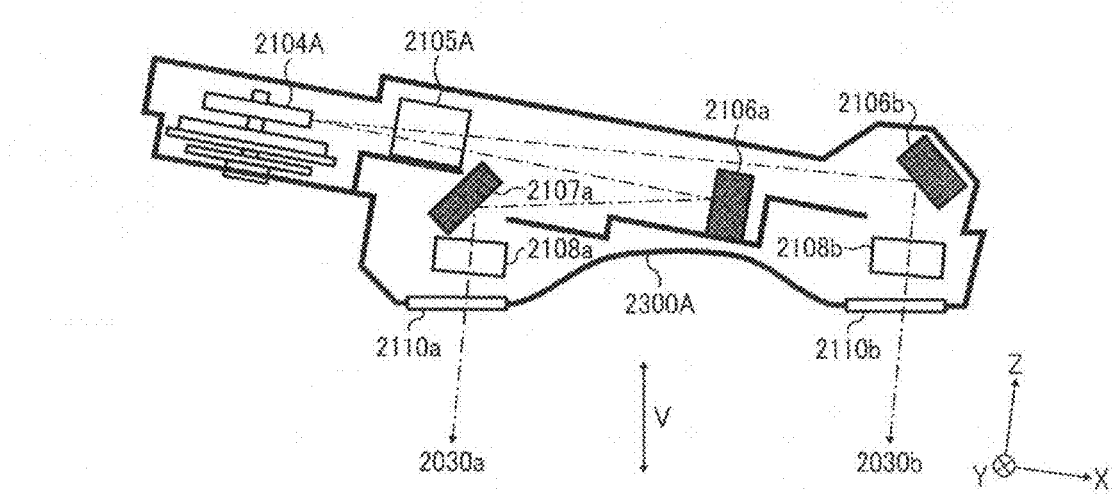
FIG. 4 is a view illustrating a scanning optical system in the first light beam scanning device of FIG. 1.

By way of example, as illustrated in FIGS. 2 to 4, the light beam scanning device 2010A includes two light sources (2200a and 2200b), two coupling lenses (2201a and 2201b), two aperture plates (2202a and 2202b), two cylindrical lenses (2204a and 2204b), a polygon mirror 2104A, a first scanning lens 2105A, three reflection mirrors (2106a, 2106b, and 2107a), two second scanning lenses (2108a and 2108b), two dust-proof glasses (2110a and 2110b), and a scanning control device (not illustrated). These modules are assembled in predetermined positions of an optical housing 2300A (not illustrated in FIGS. 2 and 3, see FIG. 4). For the sake of convenience, the reflection mirrors and second scanning lenses are not illustrated in FIG. 3.

Two slit-like outgoing windows, through which the light beams pass toward the photosensitive drums 2030a and 2030b, are provided in the optical housing 2300A. The outgoing windows are covered with the dust-proof glass 2110a and the dust-proof glass 2110b.

In this example, in a XYZ three-dimensional orthogonal coordinate system, it is assumed that a direction along a lengthwise direction of each photosensitive drum is set to a Y-axis direction, and that a direction parallel to a rotating shaft of the polygon mirror 2104A is set to a Z-axis direction.

Hereinafter, for the sake of convenience, in each optical member, a direction corresponding to a main scanning direction is referred to as a "main scanning (corresponding) direction", and a direction corresponding to a sub-scanning direction is referred to as a "sub-scanning (corresponding) direction".

The light sources 2200a and 2200b are disposed distant from each other in the Z-axis direction.

The coupling lens 2201a is disposed on an optical path of the light beam (hereinafter also referred to as a "light beam LBa") emitted from the light source 2200a, and the coupling lens 2201a forms the light beam LBa into a substantially parallel light beam.

The coupling lens 2201b is disposed on an optical path of the light beam (hereinafter also referred to as a "light beam LBb") emitted from the light source 2200b, and the coupling lens 2201b forms the light beam LBb into the substantially parallel light beam.

The aperture plate 2202a includes an aperture to shape the light beam LBa passing through the coupling lens 2201a.

The aperture plate 2202b includes an aperture to shape the light beam LBb passing through the coupling lens 2201b.

The cylindrical lens 2204a forms an image of the light beam LBa passing through the aperture of the aperture plate 2202a in the Z-axis direction near a deflecting and reflecting surface of the polygon mirror 2104A.

The cylindrical lens 2204b forms an image of the light beam LBb passing through the aperture of the aperture plate 2202b in the Z-axis direction near the deflecting and reflecting surface of the polygon mirror 2104A.

An optical system including the coupling lens 2201a, the aperture plate 2202a, and the cylindrical lens 2204a is referred to as a pre-deflector optical system of the K station.

An optical system including the coupling lens 2201b, the aperture plate 2202b, and the cylindrical lens 2204b is referred to as a pre-deflector optical system of the C station.

The polygon mirror 2104A includes a six-surface mirror in which an axial center of the rotating shaft is a rotation center, and each mirror constitutes the deflecting and reflecting surface.

The light beam LBa from the cylindrical lens 2204a and the light beam LBb from the cylindrical lens 2204b are incident to the same deflecting and reflecting surface located on the +X side of the rotation center of the polygon mirror 2104A.

More specifically, the light beams LBa and LBb are incident to the deflecting and reflecting surface from a direction that is tilted with respect to a plane orthogonal to the rotating shaft of the polygon mirror 2104A.

Hereinafter, when the light beam is incident to the deflecting and reflecting surface, the incidence of the light beam from the direction tilted with respect to the plane orthogonal to the rotating shaft of the polygon mirror is referred to as "oblique incidence", and the incidence of the light beam from the direction parallel to the plane orthogonal to the rotating shaft of the polygon mirror is referred to as "horizontal incidence". In the oblique incidence, an incident angle is referred to as an "oblique incident angle".

A configuration, in which the light source and the pre-deflector optical system are set such that the light beam is obliquely incident to the polygon mirror, is also referred to as an "oblique incident optical system".

The rotating shaft of the polygon mirror 2104A is tilted with respect to a vertical direction V. A tilt angle of the rotating shaft is larger than the oblique incident angle. For example, the tilt angle is set to 10°.

The first scanning lens 2105A is disposed on optical paths of the light beams LBa and LBb deflected by the polygon mirror 2104A.

The reflection mirrors 2106a and 2107a reflect the optical path of the light beam LBa through the first scanning lens 2105A toward the direction of the photosensitive drum 2030a.

The second scanning lens 2108a is disposed on the optical path of the light beam LBa through the reflection mirror 2107a.

Therefore, the photosensitive drum 2030a is irradiated with the light beam LBa deflected by the polygon mirror 2104A through the first scanning lens 2105A, the reflection mirror 2106a, the reflection mirror 2107a, the second scanning lens 2108a, and the dust-proof glass 2110a, thereby forming an optical spot on the surface of the photosensitive drum 2030a.

The reflection mirror 2106b reflects the optical path of the light beam LBb through the first scanning lens 2105A toward the direction of the photosensitive drum 2030b.

The second scanning lens 2108b is disposed on the optical path of the light beam LBb through the reflection mirror 2106b.

Therefore, the photosensitive drum 2030b is irradiated with the light beam LBb deflected by the polygon mirror 2104A through the first scanning lens 2105A, the reflection mirror 2106b, the second scanning lens 2108b, and the dust-proof glass 2110b, thereby forming the optical spot on the surface of the photosensitive drum 2030b.

The optical spot on the surface of each photosensitive drum moves in the lengthwise direction of the photosensitive drum with the rotation of the polygon mirror 2104A. In this example, the optical spot moving direction is the "main scanning direction" and the photosensitive drum rotating direction is the "sub-scanning direction".

In each photosensitive drum, a region where the image information is written is called an "effective scanning region (area)", an "image forming region (area)", or an "effective image region (area)".

The optical system disposed on the optical path between the polygon mirror and the photosensitive drum is also called a scanning optical system.

In this example embodiment, the first scanning lens 2105A, the two reflection mirrors (2106a and 2107a), and the second scanning lens 2108a constitute the scanning optical system of the K station.

The first scanning lens 2105A, the reflection mirrors 2106b, and the second scanning lens 2108b constitute the scanning optical system of the C station.

That is, the first scanning lens 2105A is shared by the two stations.

Now, a configuration of the light beam scanning device 2010B will be described below.

Figure 5:
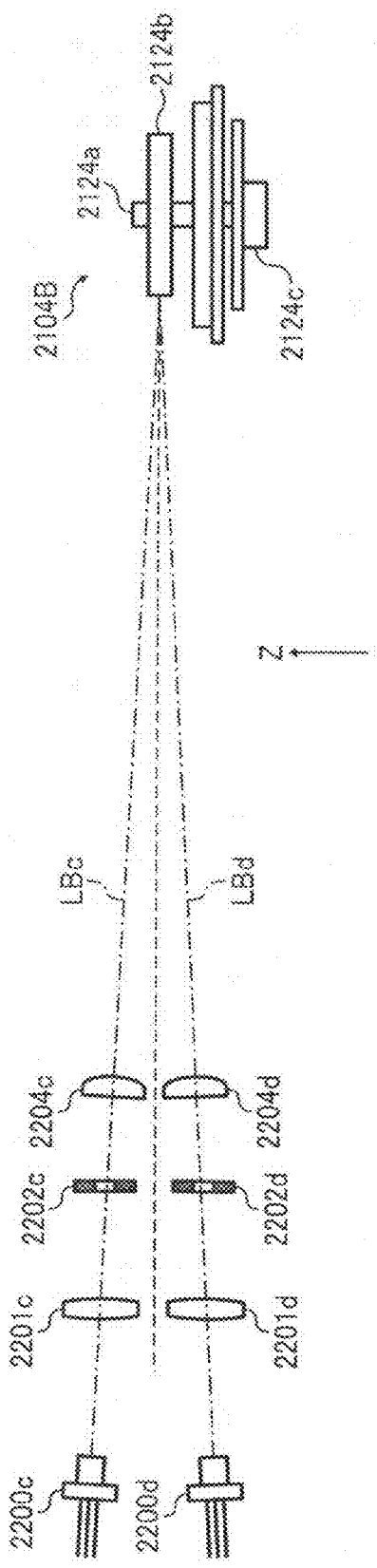
FIG. 5 is a view illustrating a light source and a pre-deflector optical system in the second light beam scanning device of FIG. 1.
Figure 6:
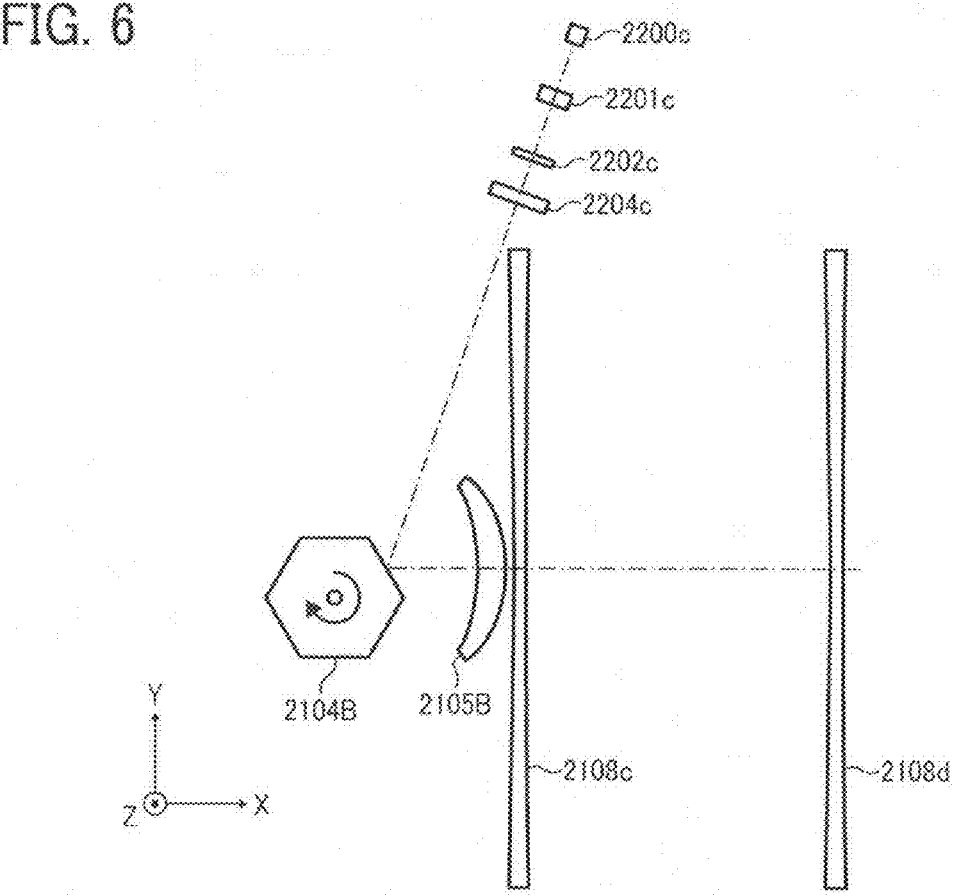
FIG. 6 is another view illustrating the light source and the pre-deflector optical system in the second light beam scanning device of FIG. 1.
Figure 7:
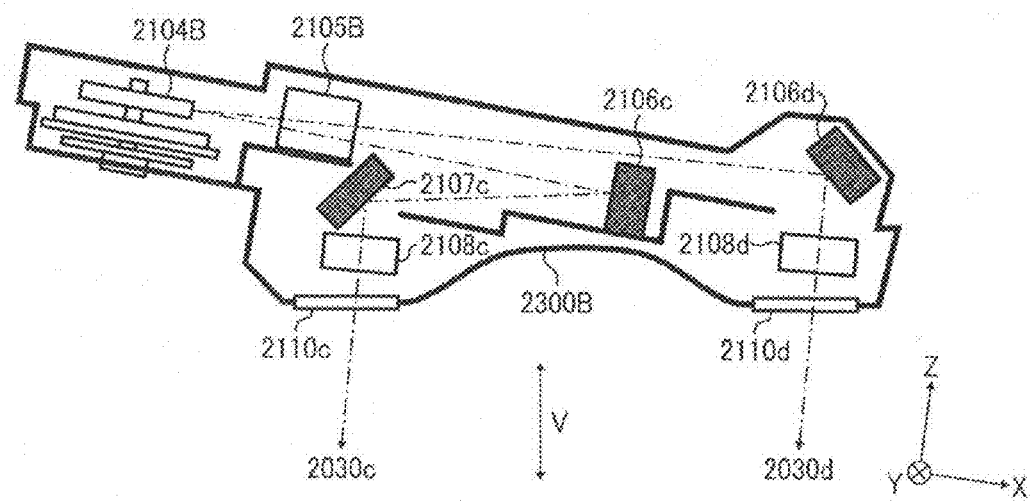
FIG. 7 is a view illustrating a scanning optical system in the second light beam scanning device of FIG. 1.

By way of example, as illustrated in FIGS. 5 to 7, the light beam scanning device 2010B includes two light sources (2200c and 2200d), two coupling lenses (2201c and 2201d), two aperture plates (2202c and 2202d), two cylindrical lenses (2204c and 2204d), a polygon mirror 2104B, a first scanning lens 2105B, three reflection mirrors (2106c, 2106d, and 2107c), two second scanning lenses (2108c and 2108d), two dust-proof glasses (2110c and 2110d), and a scanning control device (not illustrated). These modules are assembled in predetermined positions of an optical housing 2300B (not illustrated in FIGS. 5 and 6, see FIG. 7). For the sake of convenience, the reflection mirrors and second scanning lenses are not illustrated in FIG. 6.

Two slit-like outgoing windows, through which the light beams pass toward the photosensitive drums 2030c and 2030d, are provided in the optical housing 2300B. The outgoing windows are covered with the dust-proof glass 2110c and the dust-proof glass 2110d.

The light sources 2200a and 2200b are disposed distant from each other in the Z-axis direction.

The coupling lens 2201c is disposed on an optical path of the light beam (hereinafter also referred to as a "light beam LBc") emitted from the light source 2200c, and the coupling lens 2201c forms the light beam LBc into a substantially parallel light beam.

The coupling lens 2201d is disposed on an optical path of the light beam (hereinafter also referred to as a "light beam LBd") emitted from the light source 2200d, and the coupling lens 2201d forms the light beam LBd into a substantially parallel light beam.

The aperture plate 2202c includes an aperture to shape the light beam LBc passing through the coupling lens 2201c.

The aperture plate 2202d includes an aperture to shape the light beam LBd passing through the coupling lens 2201d.

The cylindrical lens 2204c forms an image of the light beam LBc passing through the aperture of the aperture plate 2202c in the Z-axis direction near the deflecting and reflecting surface of the polygon mirror 2104B.

The cylindrical lens 2204d forms an image of the light beam LBd passing through the aperture of the aperture plate 2202d in the Z-axis direction near the deflecting and reflecting surface of the polygon mirror 2104B.

An optical system including the coupling lens 2201c, the aperture plate 2202c, and the cylindrical lens 2204c is referred to as a pre-deflector optical system of the M station.

An optical system including the coupling lens 2201d, the aperture plate 2202d, and the cylindrical lens 2204d is referred to as a pre-deflector optical system of the Y station.

The polygon mirror 2104B includes a six-surface mirror in which the axial center of the rotating shaft is the rotation center, and each mirror constitutes the deflecting and reflecting surface.

The light beam LBc from the cylindrical lens 2204c and the light beam LBd from the cylindrical lens 2204d are incident to the same deflecting and reflecting surface located on the +X side of the rotation center of the polygon mirror 2104B.

In this example embodiment, the light source 2200c and the pre-deflector optical system thereof constitute an oblique incident optical system, and the light beam LBc is obliquely incident to the deflecting and reflecting surface of the polygon mirror 2104B. Similarly, the light source 2200d and the pre-deflector optical system thereof constitute an oblique incident optical system, and the light beam LBd is obliquely incident to the deflecting and reflecting surface of the polygon mirror 2104B.

The first scanning lens 2105B is disposed on the optical paths of the light beams LBc and LBd deflected by the polygon mirror 2104B.

The reflection mirrors 2106c and 2107c reflect the optical path of the light beam LBc through the first scanning lens 2105B toward the direction of the photosensitive drum 2030c.

The second scanning lens 2108c is disposed on the optical path of the light beam LBc through the reflection mirror 2107c.

Therefore, the photosensitive drum 2030c is irradiated with the light beam LBc deflected by the polygon mirror 2104B through the first scanning lens 2105B, the reflection mirror 2106c, the reflection mirror 2107c, the second scanning lens 2108c, and the dust-proof glass 2110c, thereby forming the optical spot on the surface of the photosensitive drum 2030c.

The reflection mirror 2106d reflects the optical path of the light beam LBd through the first scanning lens 2105B toward the direction of the photosensitive drum 2030d.

The second scanning lens 2108d is disposed on the optical path of the light beam LBd through the reflection mirror 2106d.

Therefore, the photosensitive drum 2030d is irradiated with the light beam LBd deflected by the polygon mirror 2104B through the first scanning lens 2105B, the reflection mirror 2106d, the second scanning lens 2108c, and the dust-proof glass 2110c, thereby forming the optical spot on the surface of the photosensitive drum 2030d.

The optical spot on the surface of each photosensitive drum moves in the lengthwise direction of the photosensitive drum with the rotation of the polygon mirror 2104B. In this example, the optical spot moving direction is the "main scanning direction" and the photosensitive drum rotating direction is the "sub-scanning direction".

The first scanning lens 2105B, the two reflection mirrors (2106c and 2107c), and the second scanning lens 2108c constitute the scanning optical system of the M station.

The first scanning lens 2105B, the reflection mirrors 2106d, and the second scanning lens 2108d constitute the scanning optical system of the Y station.

That is, the first scanning lens 2105B is shared by the two stations.

Figure 8:
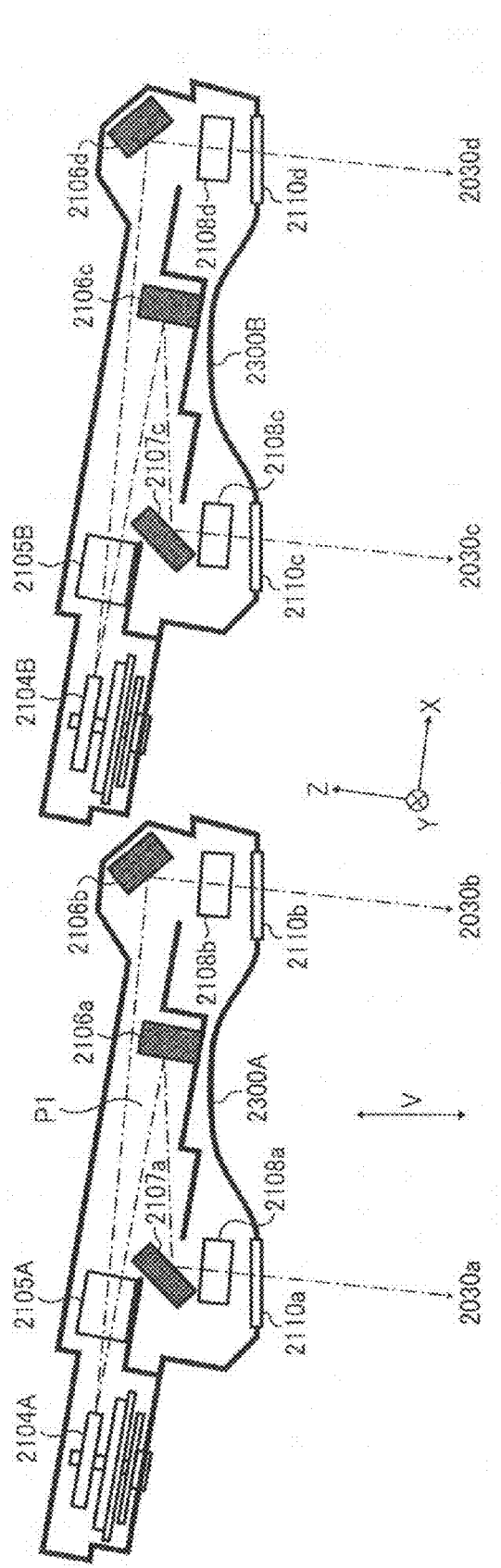
FIG. 8 is a view illustrating a positional relationship between the first light beam scanning device and the second light beam scanning device of FIG. 1.

As described above, the light beam scanning devices 2010A and 2010B have the same configuration. FIG. 8 illustrates an example of a positional relationship between the light beam scanning devices 2010A and 2010B.

A specific example of main optical members in each light beam scanning device will be described below.

Figure 9A:
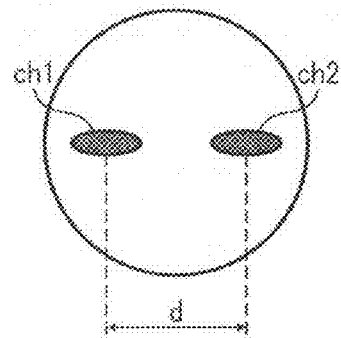
FIGS. 9A to 9C are views illustrating an LD array included in the light source of the light beam scanning device in FIG. 1.

Each light source includes an LD (Laser Diode) array, and the LD array includes two light emitting modules D1 and D2 each having an oscillation wavelength of 659 nm (see FIG. 9A). An interval d between the light emitting modules is 30 μm. In each light emitting module, when the two light emitting modules (ch1 and ch2) are arrayed, a divergent angle of a luminous flux is 32° (full angle at half maximum) in a horizontal direction and 8.5° (full angle at half maximum) in the vertical direction.

Figure 9B:
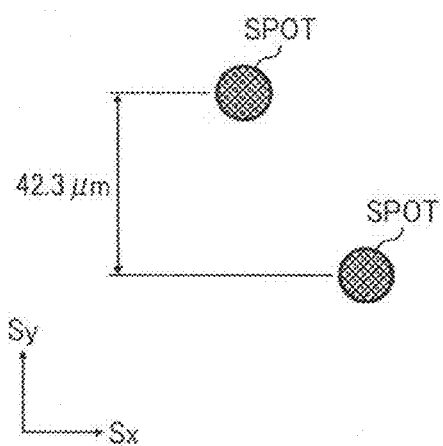
Figure 9C:
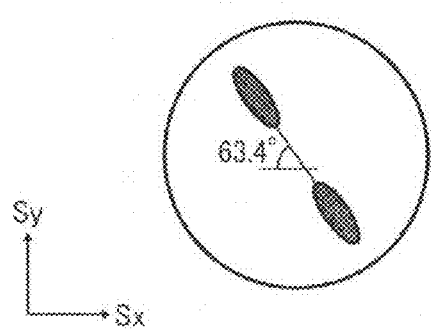

Each light source can turn about an axis, which passes through the substantial center of the light source and is parallel to the direction toward the corresponding coupling lens, and the rotation of the light source is adjusted such that pixel density of the latent image formed on the surface of the photosensitive drum corresponds to 600 dpi, namely, such that a beam interval (beam pitch) in the sub-scanning direction becomes about 42.3 μm on the surface of the photosensitive drum (see FIG. 9B). In this example, the rotation of the light source is adjusted such that a line segment connecting the two light emitting modules is tilted by 63.4° with respect to the main scanning direction (see FIG. 9C). In FIGS. 9B and 9C, Sy denotes the sub-scanning direction, and Sx denotes the main scanning direction.

Each coupling lens is a glass lens that has a refractive index of 1.515 with respect to the light beam having a wavelength of 659 nm. Each coupling lens has a focal distance of 14.5 mm.

The aperture of each aperture plate has a quadrangular or elliptical shape, which has a length of 2.84 mm in the main scanning direction and a length of 0.90 mm in the sub-scanning direction. Each aperture plate is disposed such that the center of the aperture is located near a focal position of the corresponding coupling lens.

Each cylindrical lens is a glass lens that has the refractive index of 1.515 with respect to the light beam having a wavelength of 659 nm. Each cylindrical lens has a focal distance of 87.8 mm. Each cylindrical lens has power only with respect to the sub-scanning direction.

The light beams LBa and LBc have an oblique incident angle of +2.5°, and the light beams LBb and LBd have an oblique incident angle of −2.5°.

A circle inscribed in the six-surface mirror of each polygon mirror has a radius of 13 mm.

The first scanning lens is a resin lens that has a refractive index of 1.530 with respect to the light beam having a wavelength of 659 nm. The center (on the optical axis) of the first scanning lens has a thickness of 5.2 mm.

The second scanning lens is a resin lens that has a refractive index of 1.530 with respect to the light beam having a wavelength of 659 nm. The center (on the optical axis) of the second scanning lens has a thickness of 3.0 mm.

The shapes of the optical surfaces (an incident-side optical surface and an outgoing-side optical surface) of each scanning lens are defined by the following equation (1) and equation (2).

[Formula 1]

$$x(y,z) = \frac{y^2 \cdot Cm}{1 + \sqrt{1-(1+K) \cdot (y \cdot Cm)^2}} + A_4 \cdot y^4 + A_6 \cdot y^6 + A_8 \cdot y^8 + \quad (1)$$
$$A_{10} \cdot y^{10} + A_{12} \cdot y^{12} + A_{14} \cdot y^{14} + \frac{Cs(y) \cdot z^2}{1 + \sqrt{1-(Cs(y) \cdot z)^2}}$$

[Formula 2]

$$Cs(y) = \frac{1}{Rz} + B_1 \cdot y + B_2 \cdot y^2 + B_3 \cdot y^3 + B_4 \cdot y^4 + B_5 \cdot y^5 + B_6 \cdot y^6 + \quad (2)$$
$$B_7 \cdot y^7 + B_8 \cdot y^8 + B_9 \cdot y^9 + B_{10} \cdot y^{10} + B_{11} \cdot y^{11} + B_{12} \cdot y^{12}$$

In the above-described equations, y is a distance from the optical axis in the main scanning direction and z is a distance from the optical axis in the sub-scanning direction. $Rm$ ($=1/Cm$) is a paraxial curvature radius in a "main scanning section", which includes the optical axis and is parallel to the main scanning direction, and $Rz$ is a paraxial curvature radius in a "sub-scanning section", which includes the optical axis and is orthogonal to the main scanning section. $A_4, A_6, A_8, \ldots$ and $An$ are aspherical coefficients of the shape in the main scanning direction, and $B_1$, $B_2$, $B_3$, ... and Bn are aspherical coefficients of the shape in the sub-scanning direction.

FIG. 10 illustrates example values of Rm, Rz, and the aspherical coefficients in the first scanning lens. FIG. 11 illustrates example values of Rm, Rz, and the aspherical coefficients An and Bn in the second scanning lens.

In this example, the optical surfaces (the incident-side optical surface "INCIDENT" and the outgoing-side optical surface "REFLECTED") of each scanning lens are what is called a special toroidal surface in which the curvature in the sub-scanning direction changes according to a height in the main scanning direction.

Only the outgoing-side optical surface of each second scanning lens has the power in the sub-scanning direction. In this example, the outgoing-side optical surface of each second scanning lens is the optical surface having the strongest power in the sub-scanning direction.

The scanning optical system of each station has a horizontal magnification of −0.85 in the sub-scanning direction. The design value of the optical spot in the surface of each photosensitive drum is 65 μm in the main scanning direction and 75 μm in the sub-scanning direction.

Each dust-proof glass is a glass plate that has a refractive index of 1.515 with respect to the light beam having a wavelength of 659 nm and a thickness of 1.9 mm.

The effective scanning region has a length of 220 mm in the Y-axis direction. Assuming that zero is the center of the effective scanning region in the Y-axis direction, a position in the effective scanning region is called an "image height". The effective scanning region has an image height of −110 mm in the end portion on the −Y side and an image height of +110 mm in the end portion on the +Y side.

Figure 12:
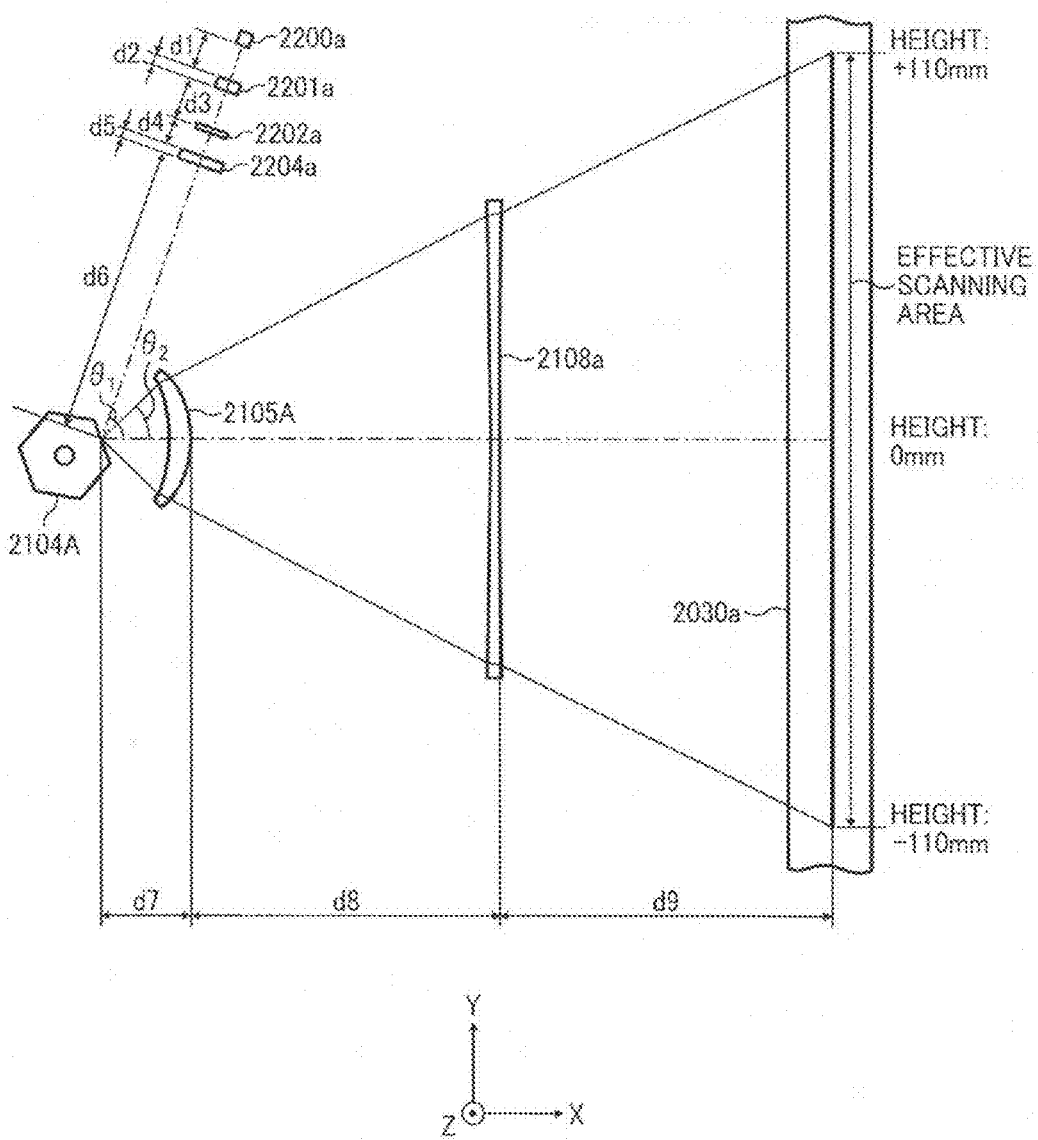
FIG. 12 is a view illustrating example dispositions of main optical members in the first light beam scanning device of FIG. 1.
Figure 13:
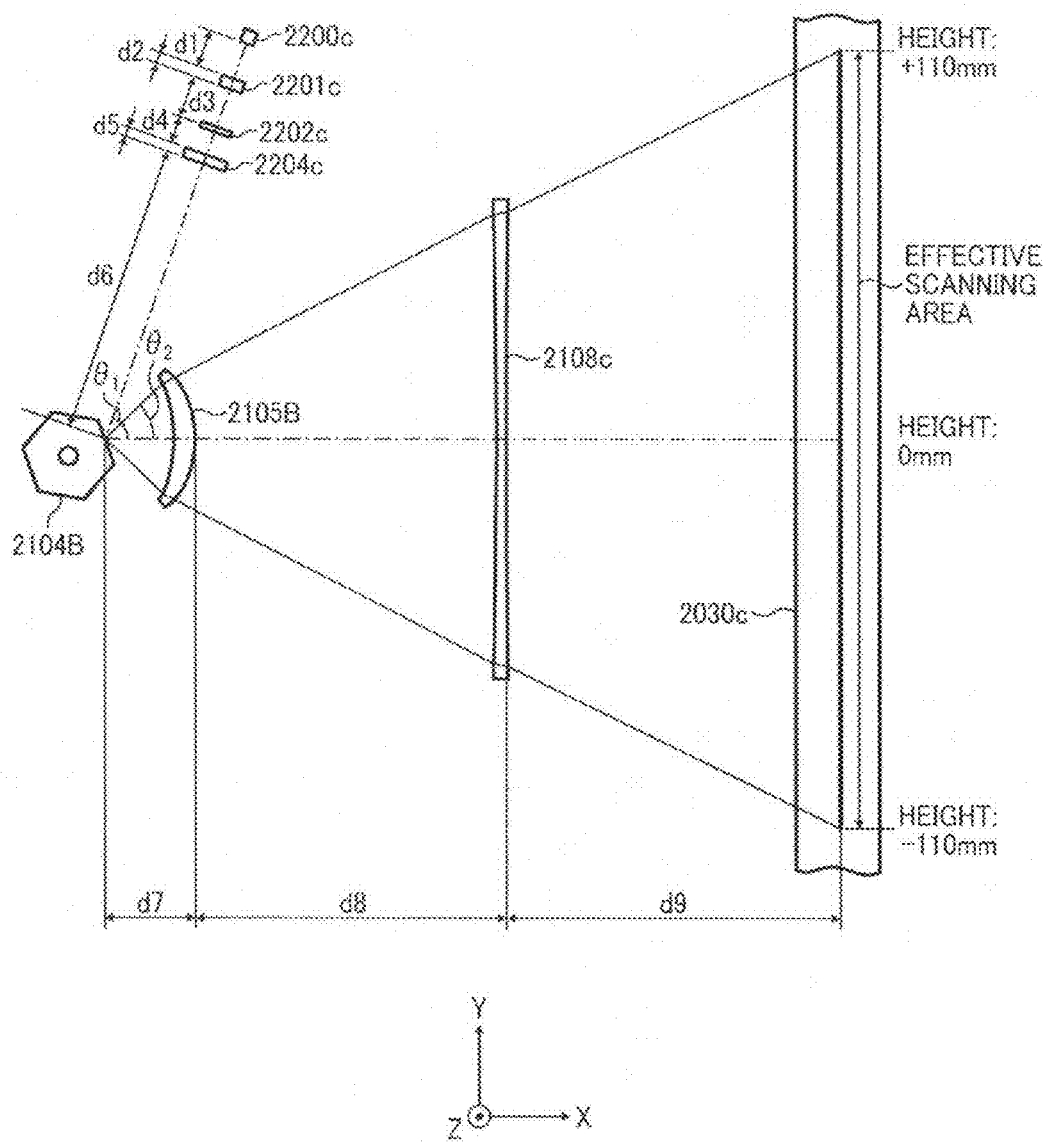
FIG. 13 is a view illustrating example dispositions of main optical members in the second light beam scanning device of FIG. 1.
Figure 16A:
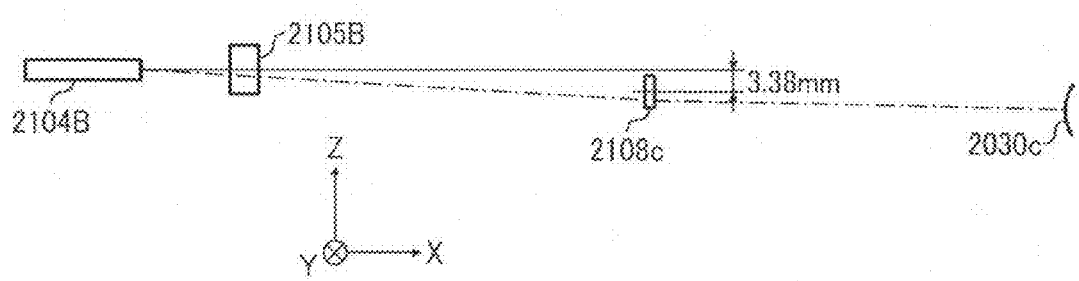
FIGS. 16A and 16B are views illustrating a relationship between the first scanning lens and the second scanning lens in the second light beam scanning device of FIG. 1.
Figure 16B:
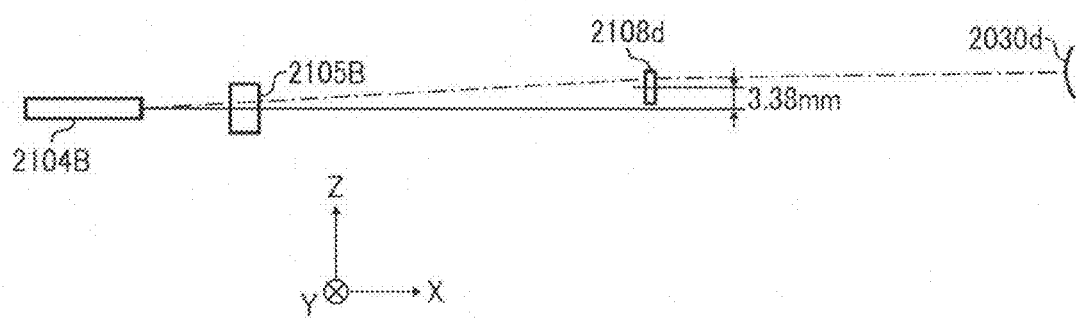

FIGS. 12 to 14 illustrate specific examples of disposition positions of main optical members in the light beam scanning device. For the purpose of easy understanding, FIGS. 12 and 13 are schematic diagrams in which the optical path is parallel to a paper surface. The values d1 to d9 are optical path lengths between the optical members, which have the respective numerical values as illustrated in FIG. 14. In this example, the half angle of view $\theta_2$ is 34.2°.

In the Z-axis direction, a reference axis of the optical surface in the first scanning lens is parallel to a reference axis of the optical surface in the second scanning lens. The reference axis of the optical surface in the second scanning lens is located distant from the reference axis of the optical surface in the first scanning lens by 3.38 mm on the −Z side or the +Z side (see FIGS. 15A to 16B). For the purpose of easy understanding, FIGS. 15A to 16B illustrate schematic diagrams based on assumption that the optical path is not reflected.

In the light beam scanning device 2010A, by way of example, as illustrated in FIG. 17, two light sources (2200a and 2200b) and two coupling lenses (2201a and 2201b) are retained by one holder 10. Hereinafter, a direction in which the direction from the light source toward the corresponding coupling lens is projected to a plane orthogonal to the Z-axis direction is referred to as a "p-direction". Because of the small oblique incident angle, the direction from the light source toward the corresponding coupling lens agrees substantially with the p-direction.

The holder 10 includes a light source retaining module 10a to which the two light sources (2200a and 2200b) are attached and a lens retaining module 10b to which the two coupling lenses (2201a and 2201b) are attached.

In the light source retaining module 10a, two through-holes are made while separated from each other in the Z-axis direction. The light source 2200a is press-fitted in the through-hole on the +Z side, and the light source 2200b is press-fitted in the through-hole on the −Z side. The through-holes are tilted with respect to the p-direction such that the oblique incident angles of the light beams LBa and LBb become 2.5°.

The coupling lens 2201a is fixed to the +Z-side surface of the lens retaining module 10b, and the coupling lens 2201b is fixed to the −Z-side surface of the lens retaining module 10b.

In the holder 10, a −Z-side end surface (hereinafter referred to as a "bracket A") of the light source retaining module 10a and a +p-side end portion (hereinafter referred to as a "bracket B") of the −Z-side surface of the lens retaining module 10b are supported by a protrusion of the optical housing 2300A.

An error of the oblique incident angle can be decreased by lengthening a center-to-center distance L3 between the brackets A and B in the p-direction.

In this example, an interval L1 between the two light sources in the Z-axis direction is 9.5 mm, a size (height) L2 of the light source retaining module 10a in the Z-axis direction is 17.0 mm, and the center-to-center distance L3 between the brackets A and B in the p-direction is 22.0 mm.

For the purpose of description, FIG. 18 illustrates a background example in which both the end portions in the Z-axis direction of the +p-side surface of the light source retaining module constitute the bracket. Assuming that a center-to-center distance L4 between the brackets separated from each other in the Z-axis direction is lengthened in order to reduce the error of the oblique incident angle, the height of the light source retaining module increases to lead to an enlargement of the light beam scanning device. For example, when the center-to-center distance L4 is maintained at 22.0 mm, the height of the light source retaining module becomes 25 mm or more in consideration of the size and strength of a screw.

In this example embodiment, referring to FIG. 17, the bracket B of the holder 10 is fixed to the optical housing 2300A at two different points in the direction (the main scanning direction) orthogonal to both the Z-axis direction and the p-direction.

Figure 19:
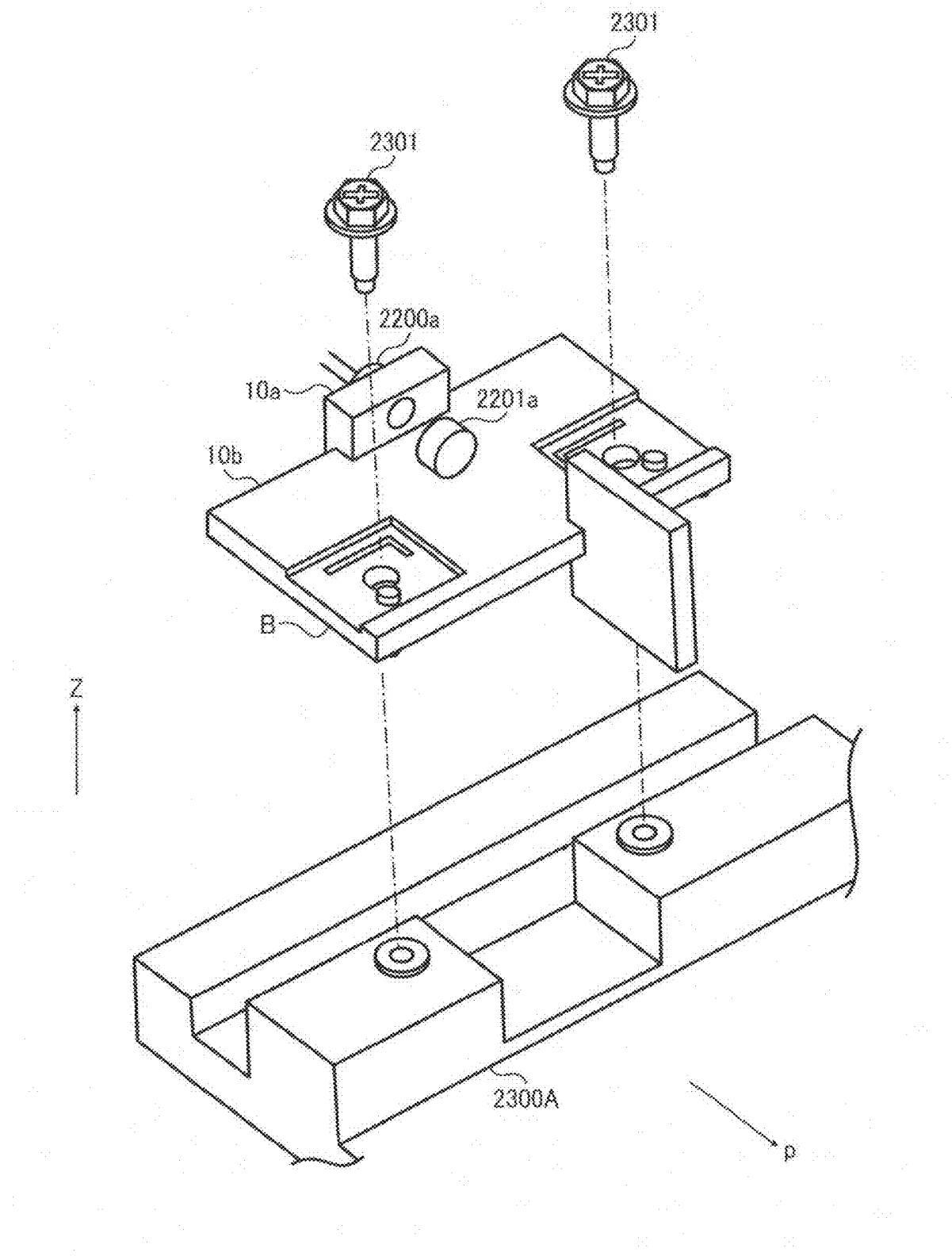
FIG. 19 is a view illustrating an example case in which an optical housing of the holder is screwed, in the first light beam scanning device of FIG. 1.

In one example, the bracket B of the holder 10 may be screwed to the optical housing 2300A as illustrated in FIG. 19. In this case, because the screw is vertically inserted from top to bottom in the bracket B of the holder 10, an assembling property is improved, and the holder 10 can be fixed to the optical housing at a desired position in a desired attitude. That is, an assembling error of the holder 10 can be reduced.

Figure 20:
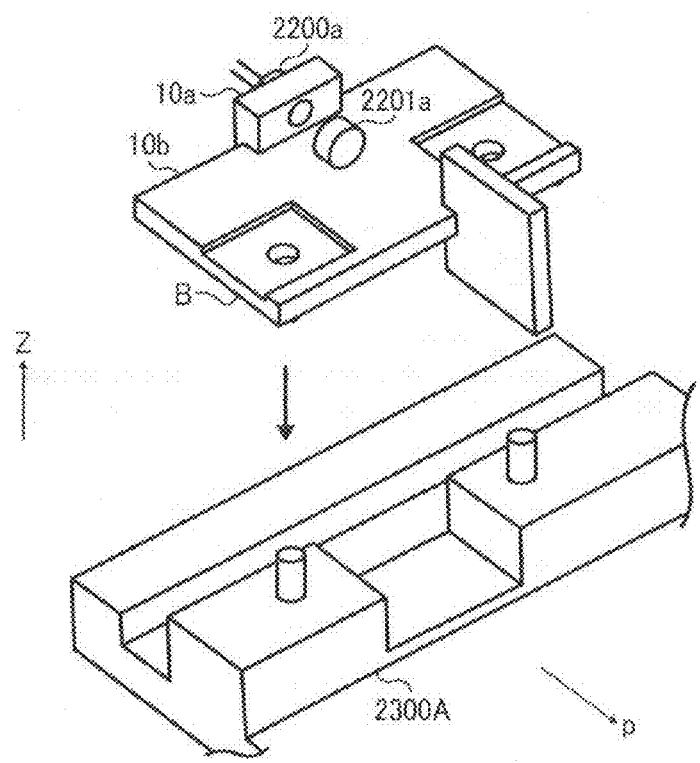
FIG. 20 is a view illustrating an example case in which the optical housing of the holder is fixed by press fitting, in the first light beam scanning device of FIG. 1.

In another example, as illustrated in FIG. 20, the holder 10 may be fixed to the optical housing 2300A such that a pin is provided in the protrusion of the optical housing 2300A and inserted in a hole made in the bracket B of the holder 10. In this case, the pin is slightly larger than the hole. Therefore, when the pin is press-fitted in the hole such that the hole is widened, the holder 10 is fixed to the optical housing 2300A, and looseness is not generated.

Figure 21:
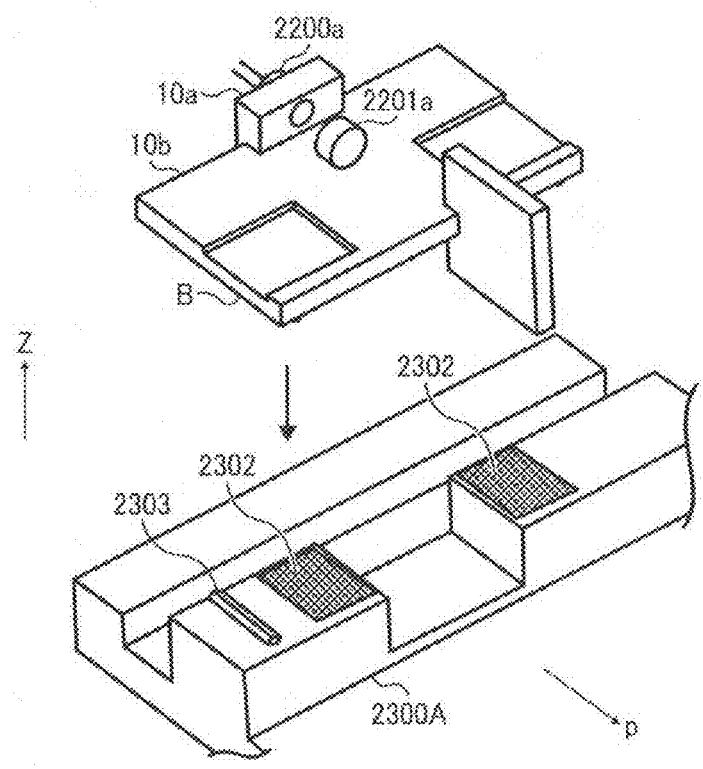
FIG. 21 is a view illustrating an example case in which the optical housing of the holder is fixed by adhesive agent, in the first light beam scanning device of FIG. 1.

In another example, as illustrated in FIG. 21, the bracket B of the holder 10 and the protrusion of the optical housing 2300A may adhere to each other using adhesion. In this example, a positioning member in which the p-direction is set to the lengthwise direction is used as the protrusion of the optical housing 2300, and the holder 10 is placed along the positioning member and adheres to the protrusion of the optical housing 2300. In this case, deformation and drag can be further reduced compared with the example case of using the screw. In the deformation caused by the screw, sometimes the holder 10 is slightly bent in the optical axis direction before and after the use of the screw, when the holder 10 is screwed to the housing at two points while bracketed at three points separated from one another in the optical axis direction as illustrated in FIG. 19. Although a deformation amount is as small as several micrometers, the deflection of the holder may possibly lead to the degradation of an optical characteristic because the positional relationship between the light source 2200 and the coupling lens 2201 is adjusted with accuracy at a level of micrometer. When an ultraviolet curable adhesion is used, after the adhesion is applied, the angles in the main scanning direction and the Z-axis direction and the position of the holder 10 in the main scanning direction are adjusted while the beam spot diameter on the image surface is viewed, and the adhesion is cured in a noncontact manner without any change. Although a micro positional deviation between the holder and the housing may be generated by shrinkage of the adhesion before and after the adhesion is cured, the LD holder is hardly deformed, and the relationship between the light source and the coupling lens is retained. Therefore, there is a little influence on the optical characteristic.

Figure 22:
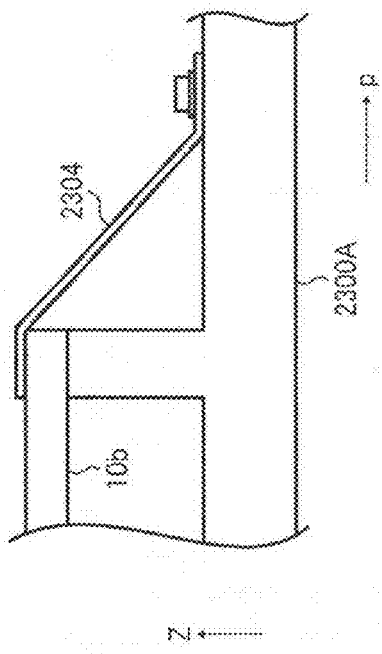
FIG. 22 is a view illustrating an example case in which the optical housing of the holder is fixed by a plate spring, in the first light beam scanning device of FIG. 1.

In another example, as illustrated in FIG. 22, the holder 10 may be fixed by a plate spring screwed to the optical housing 2300A.

In the case that the light source retaining module is screwed to a side plate of the optical housing like the example illustrated in FIG. 18, the error may be generated in the positional relationship between the light source and the optical housing due to a variation in torque of the screw. As a result, in the sub-scanning direction (identical to the Z-axis direction in this case) or the main scanning direction, the error may be generated in the traveling direction of the light beam emitted from the light source toward the polygon mirror. In contrary, in this example embodiment, in the Z-axis direction and the main scanning direction, the error in the traveling direction of the light beam emitted from the light source toward the polygon mirror can be reduced compared with the example of FIG. 18.

Figure 23:
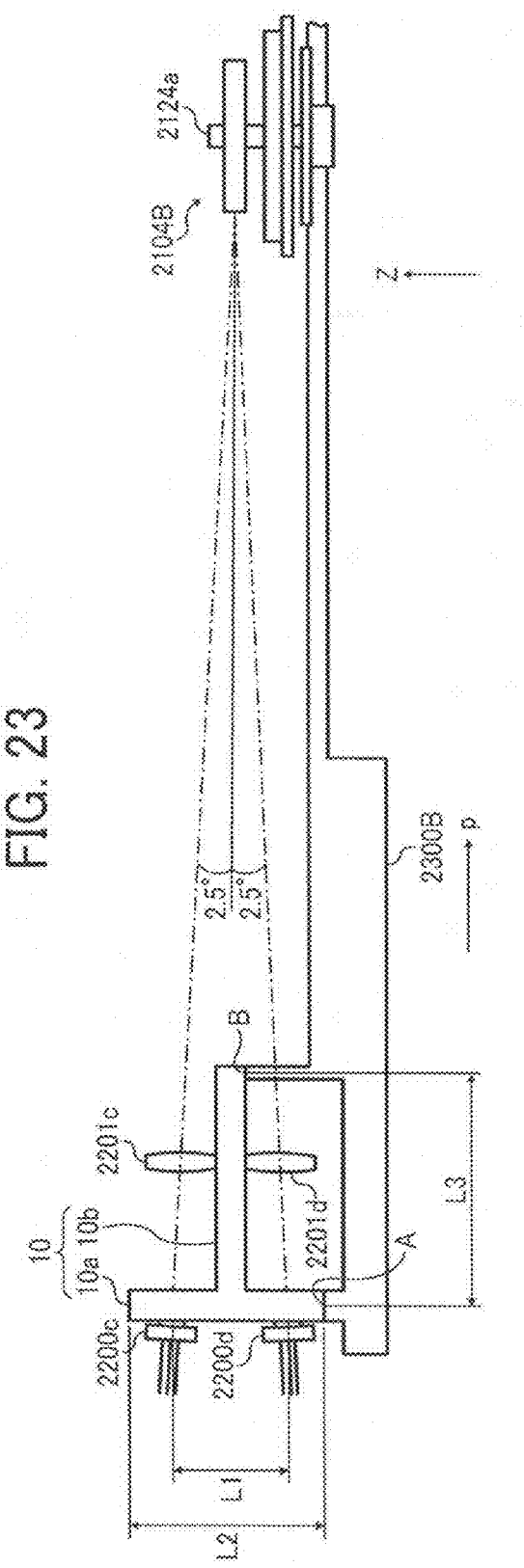
FIG. 23 is a view illustrating the holder and the bracket in the first light beam scanning device of FIG. 1, according to an example embodiment of the present invention.

In the light beam scanning device 2010B, as illustrated in FIG. 23, the two light sources (2200c and 2200d) and two coupling lenses (2201c and 2201d) are also retained by the holder 10.

In the holder 10, the brackets A and B are supported by the protrusion of the optical housing 2300B. The bracket B of the holder 10 is fixed to the optical housing 2300B at the two different points in the direction (the main scanning direction) orthogonal to both the Z-axis direction and the p-direction.

Therefore, in the light beam scanning device 2010B, in the Z-axis direction and the main scanning direction, the error in the traveling direction of the light beam emitted from the light source toward the polygon mirror can also be reduced compared with the example of FIG. 18.

As described above, in the above-described examples, the light beam scanning device includes the two light sources, the two coupling lenses, the two aperture plates, the two cylindrical lenses, the polygon mirror, the first scanning lens, the three reflection mirrors, the two second scanning lenses, the two dust-proof glasses, and the scanning control device. These modules are assembled in the predetermined positions of the optical housing.

In each light beam scanning device, the two light sources are disposed distant from each other in the Z-axis direction. The two light beams emitted from the two light sources are incident to the deflecting and reflecting surface from the direction, which is tilted with respect to the surface orthogonal to the rotating shaft of the polygon mirror.

In each light beam scanning device, the two light sources and the two coupling lenses are retained by the holder 10. The holder 10 includes a light source retaining module 10a to which the two light sources are attached and a lens retaining module 10b to which the two coupling lenses are attached.

The holder 10 is supported by the optical housing at the two different points (the brackets A and B) in the direction from the light source toward the coupling lens.

The interval L3 between the brackets A and B is set so as to be larger than the interval L1 between the two light sources in the Z-axis direction. In this case, the error of the oblique incident angle can be decreased while the size in the Z-axis direction of the optical housing is reduced.

In the holder 10, the bracket B is fixed to the optical housing at the two different points in the direction (the main scanning direction) orthogonal to both the Z-axis direction and the p-direction.

In this case, the two light beams emitted from the two light sources can accurately be incident to the deflecting and reflecting surface at the desired oblique incident angle. Therefore, in the scanning optical system, the expected optical characteristic can be achieved so as to suppress the scanning line curve and the degradation in wavefront aberration, which are caused by the oblique incident.

Therefore, the scanning line curve and the degradation in wavefront aberration can be suppressed while achieving size reduction of the device.

The color printer 2000 includes the light beam scanning device 2010A and the light beam scanning device 2010B, so that the downsizing, particularly a low profile can be achieved without degrading image quality.

Figure 24:
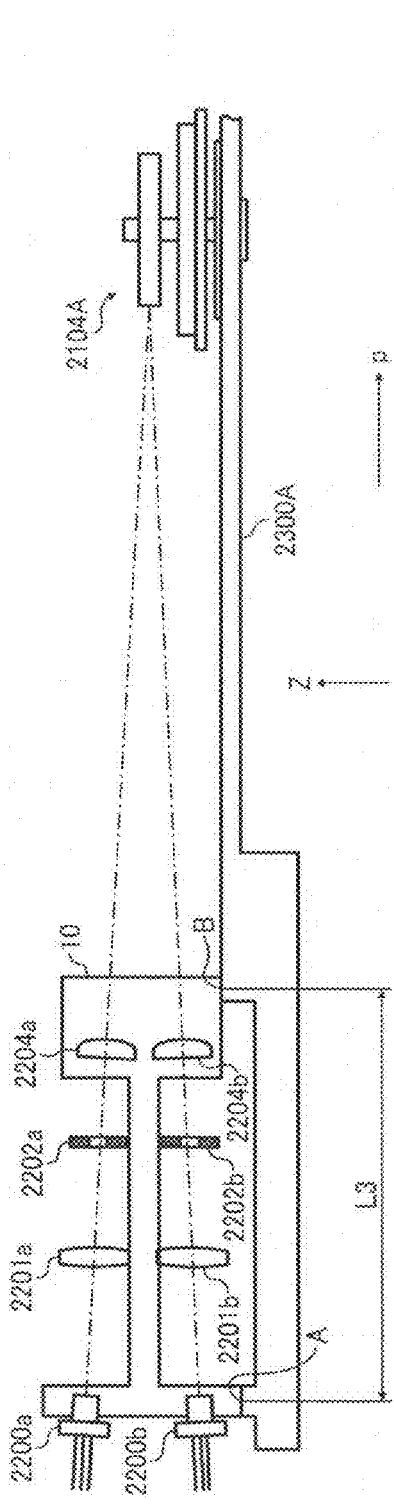
FIG. 24 is a view illustrating a holder in the first light beam scanning device of FIG. 1, according to an example embodiment of the present invention.

In another example, as illustrated in FIG. 24, the two aperture plates and the two cylindrical lenses may be retained by the holder 10. In this case, the interval L3 between the brackets A and B can be lengthened compared with the above-described example embodiment. The positions in the Z-axis direction and the p-direction of each cylindrical lens can individually be adjusted. The error of the oblique incident angle can be suppressed by adjusting the position in the Z-axis direction of the cylindrical lens. The focus position in the sub-scanning direction on the scanned surface can be adjusted by adjusting the position in the p-direction.

Figure 25:
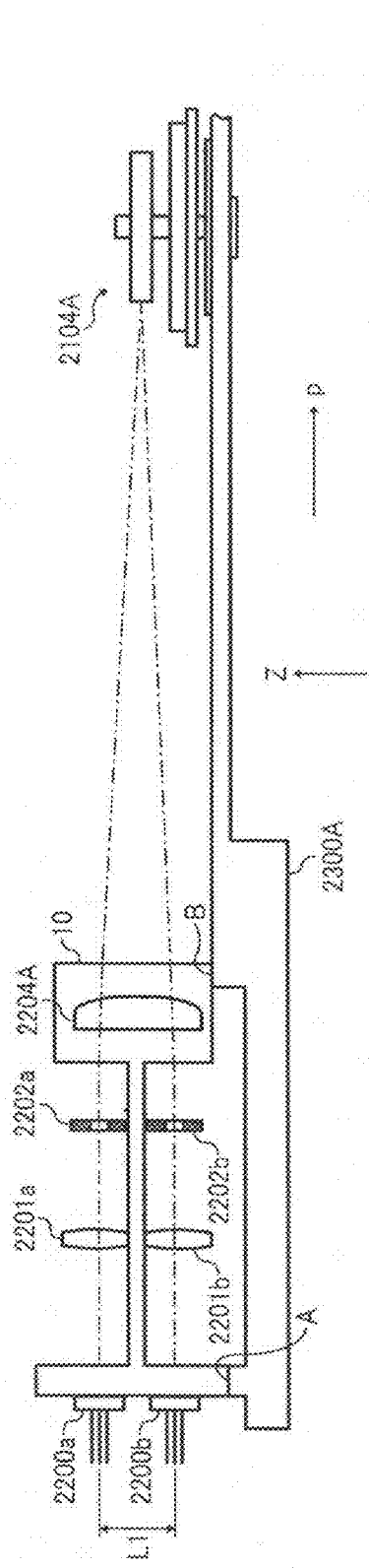
FIG. 25 is a view illustrating a holder in the first light beam scanning device of FIG. 1, according to an example embodiment of the present invention.

Further, as illustrated in FIG. 25, one cylindrical lens may be used instead of the two cylindrical lenses. In this case, when the light beams emitted from the two light sources are set so as to pass through an off-axis portion of the cylindrical lens, the outgoing directions of the light beams emitted from the two light sources can be parallel to the p-direction. Even if the oblique incident angles are identical to each other with respect to the deflecting and reflecting surface, the interval L1 between the two light sources in the Z-axis direction can be shortened compared with the above-described example embodiment. That is, the low profile of the light beam scanning device can further be achieved.

Figure 26:
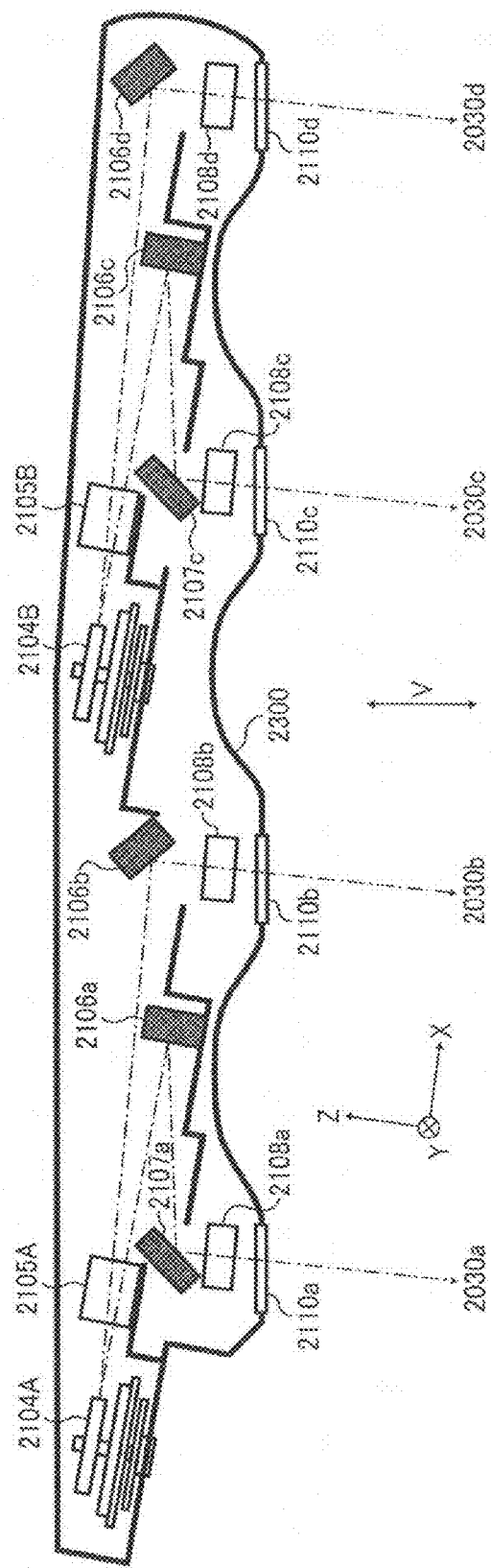
FIG. 26 is a view illustrating an example case in which the first light beam scanning device and the second light beam scanning device of FIG. 1 are integrated.

For example, the light beam scanning device 2010A and the light beam scanning device 2010B may be integrated as illustrated in FIG. 26.

Figure 27:
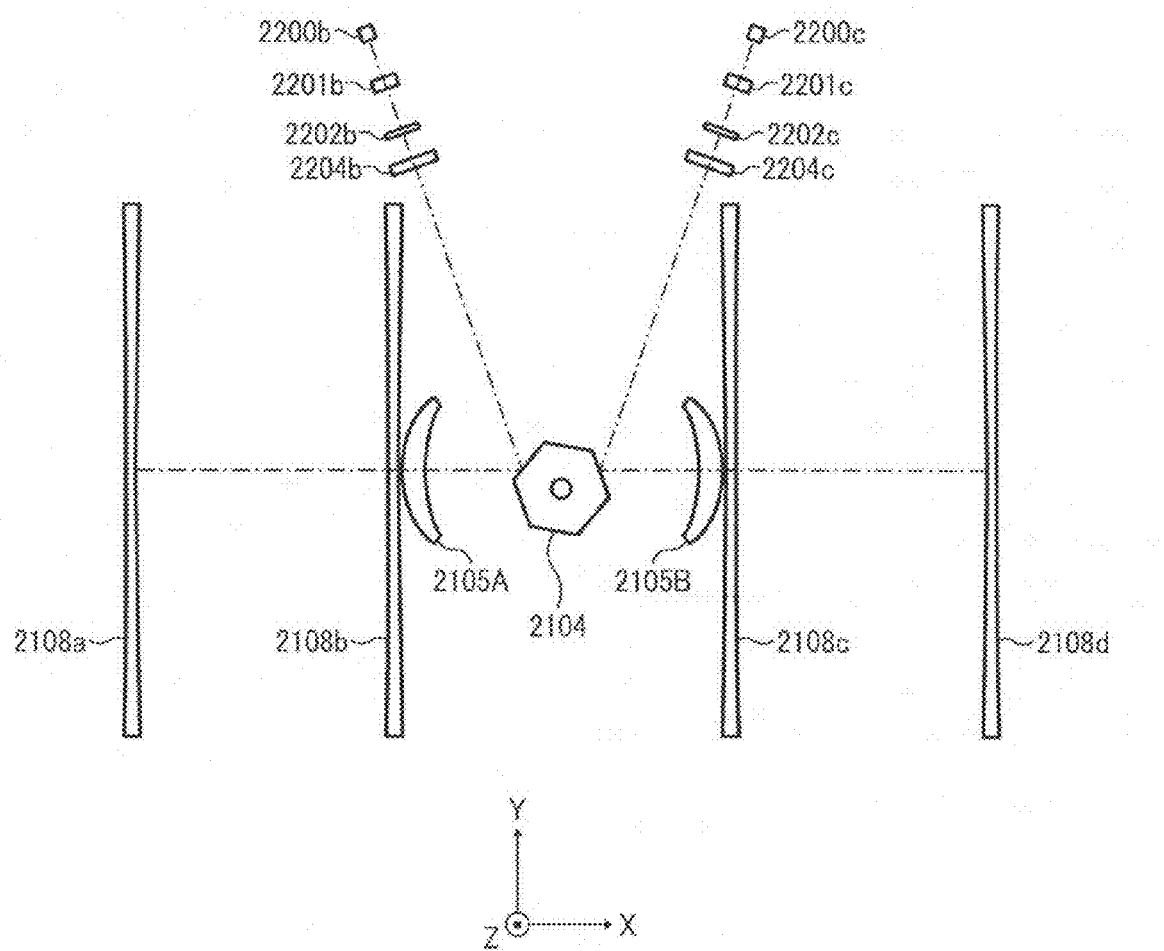
FIG. 27 is a view illustrating a configuration of a light beam scanning device in the color printer of FIG. 1, according to an example embodiment of the present invention.

For example, what is called a compound scanning system in which one polygon mirror 2104 is used in alternative to the polygon mirrors 2104A and 2104B may be adopted as illustrated in FIGS. 27 and 28.

In this example embodiment, the two light sources are disposed while separated from each other in the Z-axis direction. However, the present invention is not limited to this embodiment. For example, three or four light sources may be disposed while separated from one another in the Z-axis direction. The three or four light sources may be retained by the holder. In other words, the holder may retain the plural light sources while being supported by the optical housing at plural different points in the direction from the light source toward the coupling lens. In this case, the interval L3 between the brackets A and B is preferably set so as to be longer than the interval between the two light sources located at both ends in the Z-axis direction of the plural light sources.

Although the two brackets (the brackets A and B) are provided in this embodiment, the present invention is not limited to this embodiment. For example, at least three brackets may be provided. In this case, the interval between the two brackets located at both the ends in the p-direction of the plural brackets is set so as to be longer than the interval L1 between the two light sources.

In this example embodiment, the two light sources are disposed while separated from each other in the Z-axis direction. However, the present invention is not limited to this example embodiment. The two light sources may be disposed while separated from each other in at least the Z-axis direction. Similarly, the two brackets may be disposed while separated from each other in at least the direction from the light source toward the coupling lens.

In this example embodiment, the bracket B of the two brackets is fixed to the optical housing. However, the present invention is not limited to this embodiment. At least one of the two brackets may be fixed to the optical housing.

In this example embodiment, the bracket B is fixed to the optical housing at the two different points in the direction (the main scanning direction) orthogonal to both the Z-axis direction and the p-direction. However, the present invention is not limited to this embodiment. For example, the bracket B may be fixed to the optical housing at four different points in the main scanning direction.

In this example embodiment, the light source includes the two light emitting modules. However, the present invention is not limited to the above-described example. For example, an LD including one light emitting module may be used instead of the LD array. For example, a surface emitting laser array (a VCSEL array) in which plural surface emitting laser elements (VCSEL) are integrated may be used instead of the LD array. In this case, one photosensitive drum can simultaneously be scanned with many light beams, so that the speed enhancement of the image formation can further be achieved.

In the above-describe example image forming apparatus, the toner image is transferred from the photosensitive drum to the recording sheet through the transfer belt. Alternatively, the toner image may directly be transferred to the recording sheet.

In another example, an image forming apparatus in which a silver halide film is used as the image bearing member may be used. In this case, the latent image is formed on the silver halide film by the optical beam scanning, and the latent image can be visualized through a process equivalent to a development process in a usual silver-halide photographic process. The visualized image can be transferred to printing paper that is of a transfer target through a process equivalent to a printing process in the usual silver-halide photographic process. The image forming apparatus in which the silver halide film is used can be constructed as an optical plate making apparatus or an optical drawing apparatus that draws a CT scan image.

In the above-described image forming apparatus, a coloring medium (positive printing paper) that is colored by thermal energy of the beam spot may be used as the image bearing member. In this case, the visible image can directly be formed on the image bearing member by the optical beam scanning.

In alternative to the color printer, any desired image forming apparatus may be used including, for example, a copier, a facsimile, or a multifunctional peripheral.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

What is claimed is:

1. A light beam scanning device that scans a plurality of light beams onto a plurality of scanned surfaces in a first direction, the device comprising:
   a plurality of light sources disposed at distance from one another in a second direction that is orthogonal to at least the first direction and configured to irradiate the plurality of light beams;
   a holder configured to retain the plurality of light sources so that the light sources are stacked in the second direction, the holder including a light source retaining structure and a lens retaining structure;
   a coupling optical system configured to couple the plurality of light beams;
   a deflector configured to deflect the plurality of light beams received through the coupling optical system, the deflector including a plurality of deflecting and reflecting surfaces each rotating about a rotational shaft of the deflector, the second direction being a direction parallel to the rotational shaft of the deflector;
   a scanning optical system configured to focus the plurality of light beams deflected by the deflector, respectively, onto the plurality of scanned surfaces; and
   a housing configured to accommodate therein at least the holder,
   wherein the plurality of light beams irradiated by the plurality of light sources are incident to the deflecting and reflecting surfaces of the deflector from a direction that is tilted with respect to a plane orthogonal to the rotational shaft of the deflector,
   the holder is supported by the housing at a plurality of different positions in a third direction extending from the light sources to the coupling optical system, and the plurality of different positions at which the holder is supported includes a first attachment portion and a second attachment portion,
   the light source retaining structure includes a plate shape extending in the second direction, and the light source retaining structure holds the light sources at a prescribed distance from each other in the second direction,
   the lens retaining structure includes a plate shape extending in the third direction, and the lens retaining structure is disposed between a pair of the light sources held by the light source retaining structure in the second direction, the first attachment portion is an end face in the second direction of the light source retaining structure of the holder, the second attachment portion is an end face of the lens retaining structure of the holder in a direction opposite the light source retaining structure, and a distance between the first attachment portion and the second attachment portion in the third direction is greater than a distance between the pair of the light sources in the second direction.

2. The light beam scanning device of claim 1, wherein the first attachment portion and the second attachment portion are respectively located at both ends of the holder in the third direction, and the pair of the light sources are respectively located at both ends of the holder in the second direction.

3. The light beam scanning device of claim 1, wherein at least one position of the plurality of different positions is fixed to the housing by one of a screw, an adhesive agent, and a plate spring.

4. The light beam scanning device of claim 1, wherein one of the housing and the holder is provided with a convex section, the other one of the housing or the holder is provided with a concave section that corresponds to the convex section, and the holder is fixed to the housing by press fitting the convex section to the concave section.

5. The light beam scanning device of claim 1, further comprising:

at least one image forming lens configured to focus the plurality of light beams received via the coupling optical system toward near the deflecting and reflecting surfaces of the deflector in the second direction, wherein the at least one image forming lens is supported by the holder.

6. The light beam scanning device of claim 5, wherein the at least one image forming lens includes a single image forming lens, and the plurality of light beams pass through an off-axis location of the image forming lens.

7. The light beam scanning device of claim 1, wherein the coupling optical system is supported by the holder.

8. An image forming apparatus, comprising:

a plurality of image carriers; and the light beam scanning device of claim 1, the light beam scanning device being configured to scan the plurality of light beams onto the plurality of image carriers.

9. The light beam scanning device of claim 1, wherein the holder includes a wall extending in the second direction and a wall extending in the third direction.

10. The light beam scanning device of claim 9, wherein the light sources are supported by the wall extending in the second direction, and the coupling optical system is supported by the wall extending in the third direction.

11. The light beam scanning device of claim 1, wherein the coupling optical system is supported by the holder at a position between the first attachment portion and the second attachment portion in the third direction.

12. A light beam scanning device that scans a plurality of light beams onto a plurality of scanned surfaces in a first direction, the device comprising:

irradiating means for irradiating the plurality of light beams, the irradiating means including a plurality of light sources disposed at distance from one another in a second direction that is orthogonal to at least the first direction;

holding means for retaining the irradiating means so that the light sources are stacked in the second direction, the holding means includes a means for retaining the light sources and a means for retaining a lens;

coupling means for coupling the plurality of light beams;

deflecting means for deflecting the plurality of light beams received through the coupling means, the deflecting means including a plurality of deflecting and reflecting surfaces each rotating about a rotational shaft of the deflecting means, the second direction being a direction parallel to the rotational shaft of the deflecting means;

focusing means for focusing the plurality of light beams deflected by the deflecting means, respectively, onto the plurality of scanned surfaces; and housing means for accommodating therein at least the holding means, wherein the plurality of light beams irradiated by the irradiating means are incident to the deflecting and reflecting surfaces of the deflecting means from a direction that is tilted with respect to a plane orthogonal to the rotational shaft of the deflecting means, the holding means is supported by the housing means at a plurality of different positions in a third direction extending from the irradiating means to the coupling means, and the plurality of different positions at which the holding means is supported includes a first attachment portion and a second attachment portion, the means for retaining the light sources includes a plate shape extending in the second direction, and the means for retaining the light sources holds the light sources at a prescribed distance from each other in the second direction, the means for retaining the lens includes a plate shape extending in the third direction, and the means for retaining the lens is disposed between a pair of the light sources held by the means for retaining the light sources in the second direction, the first attachment portion is an end face in the second direction of the means for retaining the light sources of the holding means, the second attachment portion is an end face of the means for retaining the lens of the holding means in a direction opposite the means for retaining the light sources, and a distance between the first attachment portion and the second attachment portion in the third direction is greater than a distance between the pair of the light sources in the second direction.

13. The light beam scanning device of claim 12, wherein the first attachment portion and the second attachment portion are respectively located at both ends of the holding means in the third direction, and the pair of the light sources are respectively located at both ends of the holding means in the second direction.

14. The light beam scanning device of claim 12, wherein at least one position of the plurality of different positions is fixed to the housing means by fixing means.

15. The light beam scanning device of claim 12, further comprising:

at least one image forming means for focusing the plurality of light beams received via the coupling means toward near the deflecting and reflecting surfaces of the deflecting means in the second direction, wherein the at least one image forming means is supported by the holding means.

16. The light beam scanning device of claim 15, wherein the image forming means includes a single image forming lens, and the plurality of light beams pass through an off-axis location of the image forming lens.

17. The light beam scanning device of claim 12, wherein the coupling means is supported by the holding means.

18. An image forming apparatus, comprising:
- image carrying means for carrying a plurality of images thereon; and
- the light beam scanning device of claim 12, the light beam scanning device being configured to scan the plurality of light beams onto the image carrying means.

* * * * *